(12) United States Patent
Kupferschmidt et al.

(10) Patent No.: US 8,495,643 B2
(45) Date of Patent: Jul. 23, 2013

(54) MESSAGE SELECTION BASED ON TIME STAMP AND PRIORITY IN A MULTITHREADED PROCESSOR

(75) Inventors: Mark Gary Kupferschmidt, Rochester, MN (US); Eric Oliver Mejdrich, Rochester, MN (US); Paul Emery Schardt, Rochester, MN (US); Frederick Jacob Ziegler, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 12/494,541

(22) Filed: Jun. 30, 2009

(65) Prior Publication Data

US 2010/0333099 A1    Dec. 30, 2010

(51) Int. Cl.
*G06F 9/46* (2006.01)
*G06F 9/30* (2006.01)
(52) U.S. Cl.
USPC .......................................... 718/103; 712/205
(58) Field of Classification Search
USPC ...................................................... 718/103
See application file for complete search history.

(56) References Cited

U.S. PATENT DOCUMENTS

| 2003/0186724 A1* | 10/2003 | Tsutsumi et al. | 455/561 |
|---|---|---|---|
| 2006/0101465 A1* | 5/2006 | Kato et al. | 718/100 |
| 2008/0028403 A1* | 1/2008 | Hoover et al. | 718/100 |
| 2008/0147206 A1* | 6/2008 | Zahrai et al. | 700/19 |
| 2009/0125574 A1* | 5/2009 | Mejdrich et al. | 707/206 |
| 2010/0067451 A1* | 3/2010 | Hall | 370/329 |

* cited by examiner

*Primary Examiner* — Jennifer To
*Assistant Examiner* — Blake Kumabe
(74) *Attorney, Agent, or Firm* — Wood, Herron & Evans LLP

(57) ABSTRACT

A method and circuit arrangement process a workload in a multithreaded processor that includes a plurality of hardware threads. Each thread receives at least one message carrying data to process the workload through a respective inbox from among a plurality of inboxes. A plurality of messages are received at a first inbox among the plurality of inboxes, wherein the first inbox is associated with a first thread among the plurality of hardware threads, and wherein each message is associated with a priority. From the plurality of received messages, a first message is selected to process in the first thread based on that first message being associated with the highest priority among the received messages. A second message is selected to process in the first thread based on that second message being associated with the earliest time stamp among the received messages and in response to processing the first message.

27 Claims, 13 Drawing Sheets

MESSAGE SELECTION BASED ON TIME STAMP AND PRIORITY IN A MULTITHREADED PROCESSOR

FIELD OF THE INVENTION

The invention is generally related to data processing, and in particular to processor architectures and inter-communication of hardware threads therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Hardware-based pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

In particular, multithreading generally has the goal to increase utilization of a plurality of hardware threads by parallelizing the execution of those hardware threads. For example, a plurality of hardware threads are often configured for a single process and those plurality of hardware threads may be concurrently executed or time division multiplexed to execute that process. Those plurality of hardware threads are often further disposed across multiple processor cores and are thus usually configured to communicate messages with each other to complete the process.

However, in a multiple processor core system, hardware threads often attempt to communicate with a single hardware thread. As such, performance bottlenecks can occur while that single hardware thread attempts to process the messages it has received from other threads. To that end, one technique for improving the inter-thread communication of hardware threads has been to implement a selection of messages based on message priority. However, this typically results in lower priority messages being shuffled down a queue in lieu of processing higher priority messages. As a typical example, a first hardware thread often generates prioritized messages for a second hardware thread that may itself generate prioritized messages for the first hardware thread. The first and second hardware threads may be configured to execute some portion of a parallelized process, and in some circumstances, the first and second hardware threads may enter a loop in which the second hardware thread ends up processing messages from only the first hardware thread and the first hardware thread ends up processing messages from only the second hardware thread. As such, the first and second hardware threads may block out messages from other hardware threads and/or processes.

In addition to problems that may occur with hardware thread loops, lower priority messages are often eliminated for newer and higher priority messages. As such, the hardware threads that generated and sent those low priority messages may experience even greater performance bottlenecks as a result of priority-based message management. This, in turn, often causes a performance bottleneck in the execution of the parallelized process and/or additional hardware threads.

Therefore, there exists a need for a more efficient way to manage the inter-thread communication of hardware threads to process a workload.

SUMMARY OF THE INVENTION

Embodiments of the invention address these and other problems associated with the prior art by providing a method of processing a workload with a plurality of hardware threads that includes selecting the message with the highest priority for processing in a first hardware thread and subsequently selecting the message with the earliest timestamp for processing in the first hardware thread. By doing so, lower priority messages will be processed without impeding the processing of high priority messages, and thus improve inter-thread communication. In particular, aspects of the invention may be implemented in a hardware framework that includes a plurality of interconnected multi-threaded and multi-core processing elements, such as that in a Network On Chip (NOC) integrated circuit device. In those aspects, hardware threads may be configured with inboxes to receive messages for processing a task. As such, aspects of the invention to select messages for processing in a first hardware thread may be disposed in the hardware framework and associated with individual hardware threads.

Consistent with aspects of the invention, a method is provided to process a workload in a multithreaded processor of the type that includes a plurality of hardware threads. Each of the plurality of hardware threads is configured to receive at least one message carrying data to process the workload through a respective inbox from among a plurality of inboxes. The method includes, receiving a plurality of messages at a first inbox among the plurality of inboxes, wherein the first inbox is associated with a respective first hardware thread among the plurality of hardware threads, and wherein each of the plurality of messages includes a priority associated therewith. The method further includes selecting a first message among the plurality of received messages to process in the first hardware thread based on the first message having a highest priority among the plurality of received messages from the plurality of received messages and selecting a second message among the plurality of messages to process in the first hardware thread based on the second message having an earliest time stamp among the plurality of received messages in response to processing the first message.

Consistent with additional aspects of the invention, a method is provided to process a workload in a multithreaded processor of the type that includes a plurality of hardware threads. Each of the plurality of hardware threads configured to receive at least one prioritized message carrying data to process the workload through a respective priority message buffer from among a plurality of priority message buffers, and each of the plurality of hardware threads configured to receive at least one message carrying data to process the workload through a respective inbox from among a plurality of inboxes. The method includes receiving a plurality of prioritized messages at a first priority message buffer among the plurality of priority message buffers, wherein the first priority message buffer is associated with a respective first hardware thread among the plurality of hardware threads, and wherein each of the prioritized messages includes a priority associated therewith. The method further includes receiving a plurality of messages at a first inbox among the plurality of inboxes, wherein the first inbox is associated with the first hardware thread, and wherein each of the plurality of messages does not include a priority associated therewith. From the plurality of received prioritized messages, a first prioritized message is selected from among the plurality of received prioritized messages to process in the first hardware thread based on the first prioritized message having a highest priority among the plurality of received prioritized messages. In response to processing the first prioritized messages, a first message is selected from among the plurality of received messages and the plurality of received prioritized messages to process in the first hardware thread based on the first message having an earliest time stamp among the plurality of received messages and the plurality of received prioritized messages.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
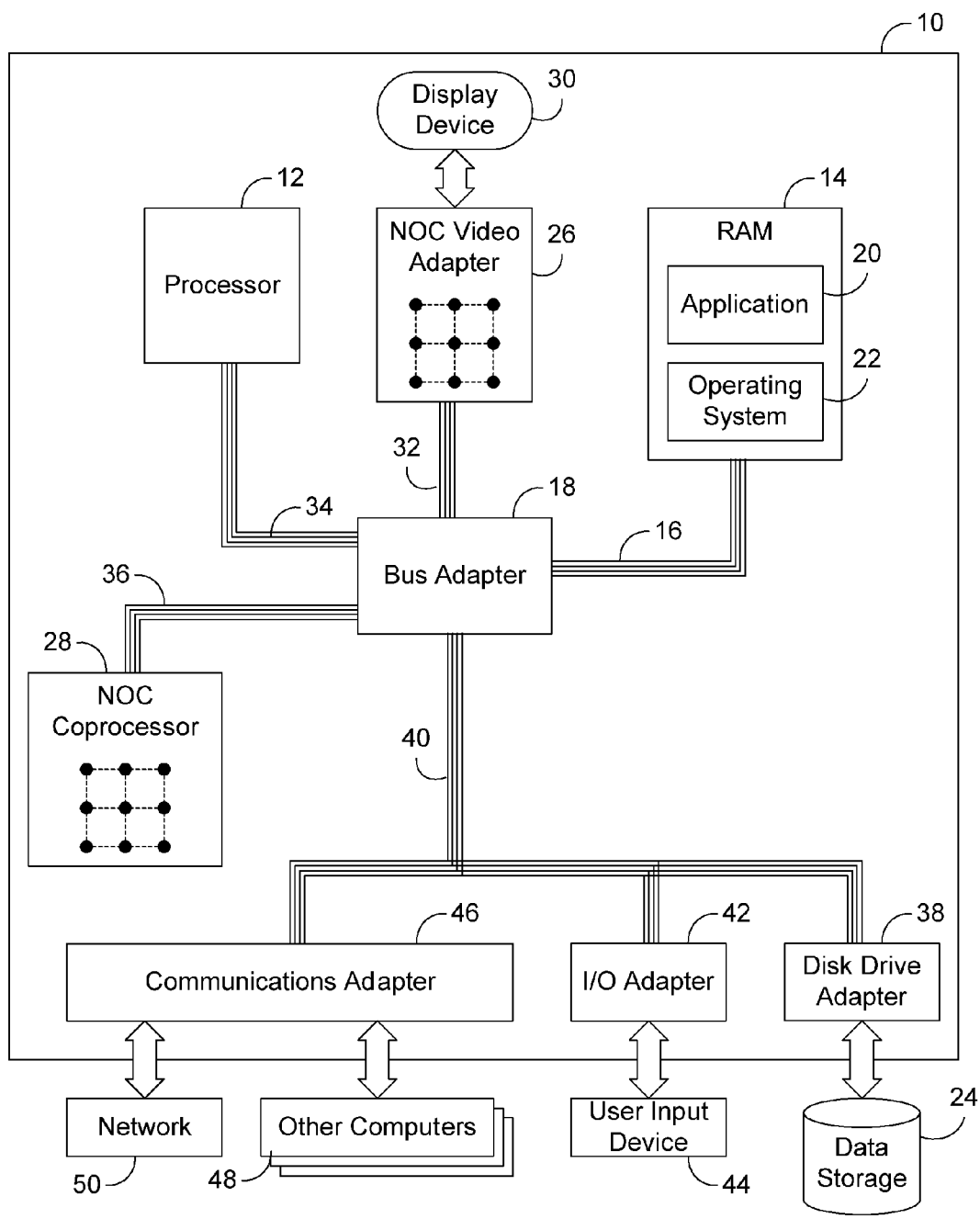
FIG. 1 is a block diagram of exemplary automated computing machinery including an exemplary computer useful in data processing consistent with embodiments of the present invention.

Embodiments consistent with the invention provide a method and circuit arrangement to process a workload with a plurality of hardware threads having respective inboxes that includes selecting a first message with the highest priority for processing in a first hardware thread and subsequently selecting a second message with the earliest timestamp for processing in the first hardware thread. In particular, embodiments of the invention avoid inefficiencies caused by selecting messages based only on the timestamps of those messages. Selecting messages based only on their timestamps may result in only newer, or older, messages being selected by a hardware thread, and thus the hardware thread may ignore potentially high priority messages that should be processed more immediately. Furthermore, embodiments of the invention avoid inefficiencies that may be caused by selecting messages based only on the priorities of those messages. Selecting messages based only on their priorities may result in lower priority messages being dismissed by a hardware thread and eventually ejected from an inbox associated with that hardware thread. By selecting a first message with the highest priority and subsequently selecting a second message with the earliest timestamp, lower priority messages may be processed without impeding the processing of high priority messages, and vice versa, and thus inter-thread communication may be improved.

Consistent with embodiments of the invention, a hardware thread is at least a portion of a processor configured to process at least a portion of a task. For the most part, each hardware thread is treated like an independent processor by software resident in the computer system upon which it is configured. Thus, each hardware thread may provide an independent unit of execution to process that at least a portion of a task. Therefore, in a multithreaded processor, multiple independent units of execution may each process at least a portion of a task concurrently or otherwise in parallel.

Considering that a plurality of hardware threads may be configured to inter-communicate in a processor, across a plurality of processors, or in a Network On Chip (NOC) integrated circuit device, each of the plurality of hardware threads may be configured with at least one inbox in which to receive messages that may include data to be processed. In addition to the data to be processed, each of the messages may be associated with a time at which that message was sent to and/or received at an inbox, and/or a priority. In particular, the data associated with the time at which that message was sent to and/or received at the inbox (colloquially, a "timestamp") may include data indicating the minute, second, millisecond, microsecond, nanosecond, picosecond, and/or combinations thereof at the time of the timestamp. For example, the timestamp may include data indicating the minute, second, millisecond, microsecond, nanosecond, and picosecond encoded in binary in a portion of the message specifically allocated for that timestamp or in configuration data associated with that message (e.g., if the timestamp is 01:02:020:040:090:100, the timestamp may be indicated in a portion of the message as "0000 0001 0000 0010 0000 00010 0000 0000 0100 0000 0000 1001 0000 0001 0000 0000"). It will be appreciated that the timestamp may be indicated in an alternative manner, including in an alternative base (e.g. more or less than the base 16 associated with hexadecimal), and that the timestamp may include only some of the data indicating time described above.

In addition to the timestamp, at least a portion of the messages to be processed may be associated with a priority. In some embodiments, the priority indicates the privilege or precedence of the message. For example, it may be desired that a process be assigned a high privilege and allowed greater access to resources to execute. Thus, messages associated with that process sent for processing at the hardware threads may be associated with that corresponding high priority. In some embodiments, the priority is included in at least a portion of the message, and thus may include one or more bits. For example, the priority may include one bit to indicate a simple priority or up to about eight bits to indicate a range of priorities. In alternative embodiments, the priority is associated with the message in configuration data separate from the message.

In some embodiments, the hardware threads may include at least two inboxes: at least one first inbox for messages associated with a priority (e.g., at least one "priority message buffer") and at least one second inbox for messages that are not associated with a priority. In this manner, prioritized and/or timestamped messages for a hardware thread may be separate and thus more quickly selected. For example, the hardware thread may select a first message based on priority from the priority message buffer, then select a second message based on timestamps from the inbox and/or the priority message buffer.

Thus, and in some embodiments, a method of processing a workload in a multithreaded processor of the type that includes a plurality of hardware threads is provided. As such, each of the plurality of hardware threads is configured to receive at least one message carrying data to process the workload through a respective inbox from among a plurality of inboxes. The method comprises receiving a plurality of messages at a first inbox among the plurality of inboxes, wherein the first inbox is associated with a respective first hardware thread among the plurality of hardware threads, and wherein each of the plurality of messages includes a priority associated therewith. The method further includes, from the plurality of received messages, selecting a first message among the plurality of received messages to process in the first hardware thread based on the first message being associated with a highest priority among the plurality of received messages and, in response to processing the first message, selecting a second message among the plurality of messages to process in the first hardware thread based on the second message being associated with an earliest time stamp among the plurality of received messages.

In those embodiments, selecting the first message may include determining that two or more messages among the plurality of messages are associated with the highest priority among the plurality of received messages and selecting the first message among the two or more messages to process in the first hardware thread based on the first message being associated with an earliest time stamp among the two or more messages. Additionally, selecting the second message may include determining that two or more messages among the plurality of messages are associated with the earliest time stamp and selecting the second message among the two or more messages to process in the first hardware thread based on the second message being associated with the highest priority among the two or more messages. Furthermore, in those embodiments the method may include configuring the first hardware thread to process at least a portion of a software pipeline.

In alternative embodiments, a method of processing a workload in a multithreaded processor of the type that includes a plurality of hardware threads is provided. As such, each of the plurality of hardware threads may be configured to receive at least one prioritized message carrying data to process the workload through a respective priority message buffer from among a plurality of priority message buffers, and each of the plurality of hardware threads may be configured to receive at least one message carrying data to process the workload through a respective inbox from among a plurality of inboxes. The method comprises receiving a plurality of prioritized messages at a first priority message buffer among the plurality of priority message buffers, wherein the first priority message buffer is associated with a respective first hardware thread among the plurality of hardware threads, and wherein each of the prioritized messages includes a priority associated therewith. The method further comprises receiving a plurality of messages at a first inbox among the plurality of inboxes, wherein the first inbox is associated with the first hardware thread, and wherein each of the plurality of messages does not include a priority associated therewith. Thus, the method includes, from the plurality of received prioritized messages, selecting a first prioritized message among the plurality of received prioritized messages to process in the first hardware thread based on the first prioritized message having a highest priority among the plurality of received prioritized messages and, in response to processing the first prioritized message, selecting a first message among the plurality of received messages and the plurality of received prioritized messages to process in the first hardware thread based on the first message having an earliest time stamp among the plurality of received messages and the plurality of received prioritized messages.

In those embodiments, selecting the first prioritized message may include determining that two or more prioritized messages among the plurality of prioritized messages are associated with the highest priority among the plurality of received prioritized messages and selecting the first prioritized message among the two or more prioritized messages to process in the first hardware thread based on the first prioritized message being associated with an earliest time stamp among the two or more prioritized messages. Additionally, selecting the first message may include determining that two or more messages among the plurality of received messages and the plurality of received prioritized messages are associated with the earliest time stamp and selecting the first message among the two or more messages to process in the first hardware thread based on the first message being associated with the highest priority among the two or more messages. In those embodiments, the first message may be a second prioritized message. Additionally, in those embodiments, the method may further include configuring the first hardware thread to process at least a portion of a software pipeline.

Additional embodiments of the invention provide for circuit arrangements to select messages. In some embodiments, a circuit arrangement is provided that comprises a plurality of hardware threads configured to process a workload, a plurality of inboxes in communication with the respective plurality of hardware threads, each of the plurality of inboxes configured to receive a plurality of messages, and control logic disposed in each of the plurality of hardware threads. The control logic is configured to, during processing of at least a portion of the workload in a first hardware thread among the plurality of hardware threads, select a first message among a plurality of messages received at a respective first inbox among the plurality of inboxes to process in the first hardware thread based on the first message being associated with a highest priority among the plurality of received messages. Moreover, the control logic is configured to, in response to processing the first message, select a second message among the plurality of messages to process in the first hardware thread based on the second message being associated with an earliest time stamp among the plurality of received messages.

In some additional embodiments, a circuit arrangement is provided that comprises a plurality of hardware threads configured to process a workload, a plurality of priority message buffers in communication with the respective plurality of hardware threads, and a plurality of inboxes in communication with the respective plurality of hardware threads. Each of the plurality of priority message buffers may be configured to receive a plurality of prioritized messages, while each of the plurality of inboxes may be configured to receive a plurality of messages. The circuit arrangement may further include control logic disposed in each of the plurality of hardware threads. The control logic may be configured to, during processing of at least a portion of the workload in a first hardware thread among the plurality of hardware threads, select a first prioritized message among the plurality of prioritized messages received at a respective first priority message buffer among the plurality of priority message buffers to process in the first hardware thread based on the first prioritized message being associated with a highest priority among the plurality of received prioritized messages. Moreover, the control logic may be further configured to select a first message among the plurality of messages received at a respective first inbox among the plurality of inboxes and the plurality of received prioritized messages to process in the first hardware thread based on the first message being associated with an earliest time stamp among the plurality of received messages and the plurality of received prioritized messages.

A program product may comprise a computer readable medium and program code resident on that computer readable medium and defining at least one of the embodiments of the circuit arrangements. Additionally, an integrated circuit device may include at least one of the embodiments of the circuit arrangements. The integrated circuit device may further comprise an interconnected set of hardware-based processing elements, wherein the first hardware thread is disposed on at least one hardware-based processing element of the interconnected set of hardware-based processing elements. As such, the interconnected set of hardware-based processing elements may comprise a plurality of nodes interconnected to one another in an NOC arrangement. Moreover, at least a subset of the plurality of hardware threads may be configured in at least a portion of a software pipeline such that the first hardware thread is configured in the at least a portion of the software pipeline.

Other variations and modifications will be apparent to one of ordinary skill in the art. Therefore, the invention is not limited to the specific implementations discussed herein.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, Microsoft Windows VISTA™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIG. 2 and FIG. 3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, Serial Advanced Technology Attachment ('SATA') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
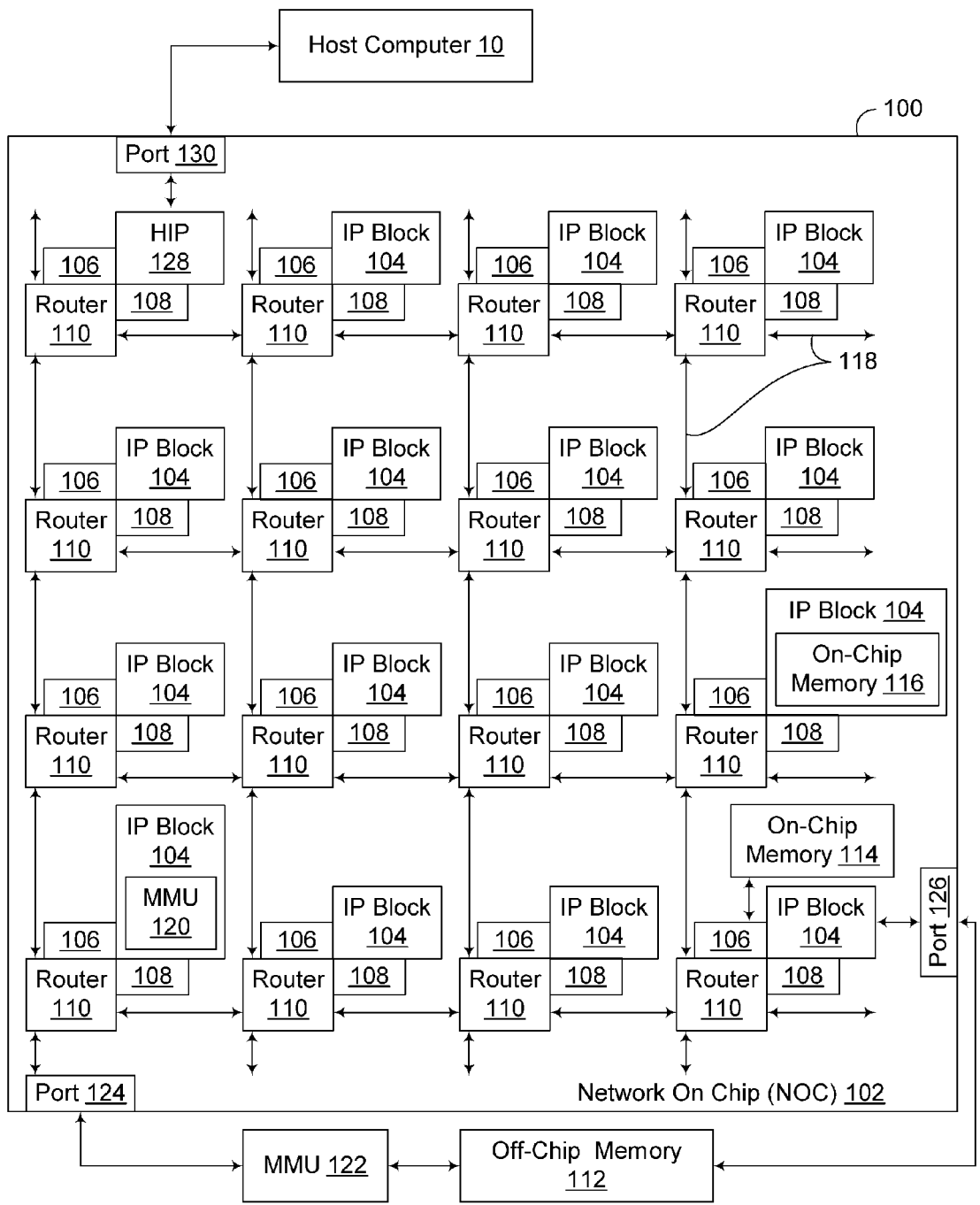
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to communicate with a router 110 through a memory communications controller 106 and a network interface controller 108. Each memory communications controller 106 controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the illustration of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
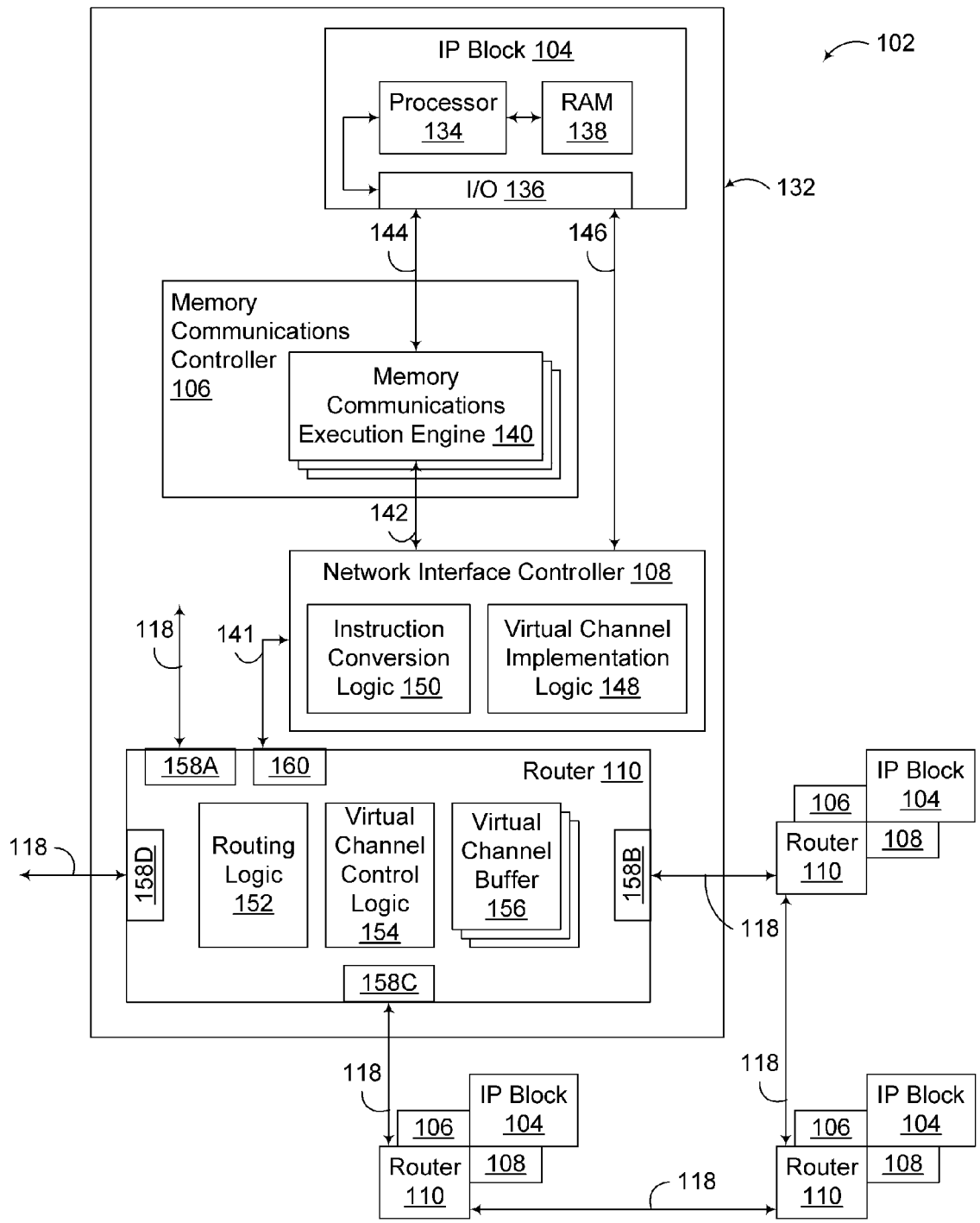
FIG. 3 is a block diagram illustrating in greater detail an exemplary implementation of a node from the NOC of FIG. 2.

FIG. 3 next illustrates a functional block diagram illustrating in greater detail the components that may be implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIG. 2 and FIG. 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
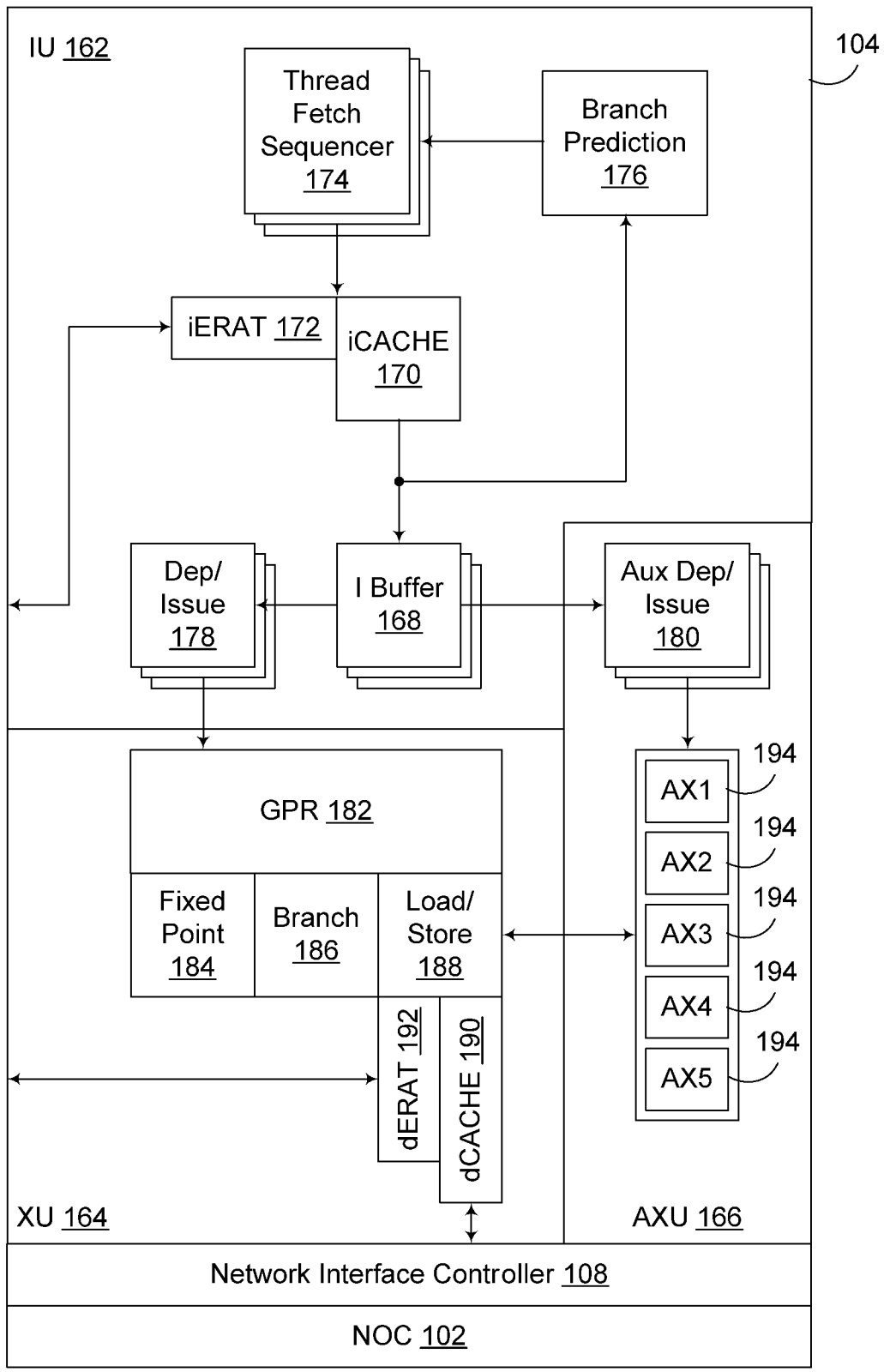
FIG. 4 is a block diagram illustrating an exemplary implementation of an IP block from the NOC of FIG. 2.

FIG. 4 next illustrates in another manner implementation of an IP block 104 consistent with embodiments of the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread are fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Software Pipelining

Figure 5:
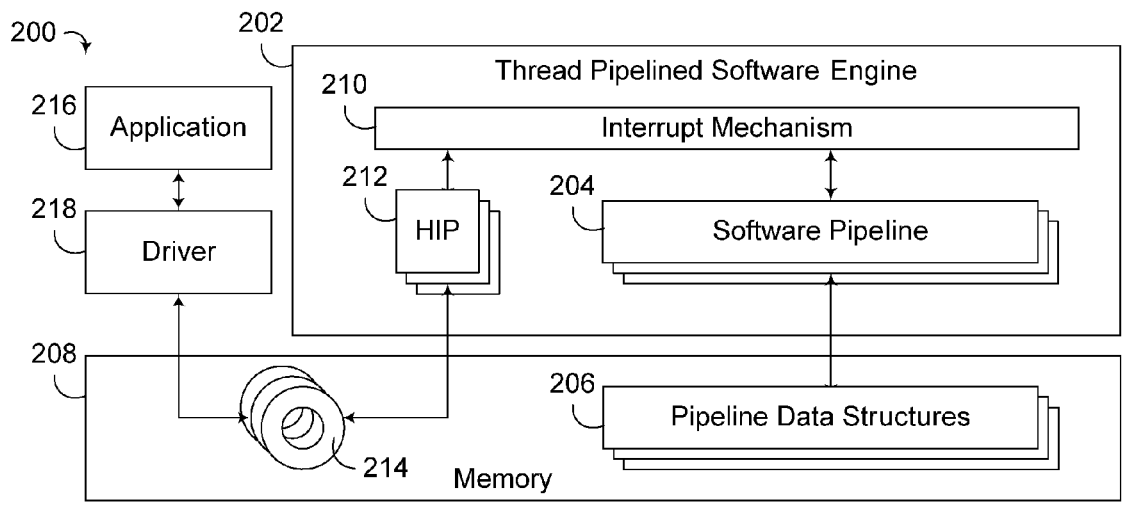
FIG. 5 is a block diagram of a thread pipelined software engine suitable for implementation in the NOC of FIG. 2.

Turning now to FIG. 5, NOC 102 may be used in some embodiments to implement a software-based pipeline. In particular, FIG. 5 illustrates an exemplary processing unit 200 incorporating a thread pipelined software engine 202 that may be used to implement and execute one or more software pipelines 204 on top of a NOC architecture. Each pipeline 204 is typically allocated one or more data structures 206 in a shared memory 208 to enable different stages of a pipeline to exchange data. Furthermore, an interrupt mechanism 210 is provided to enable stages of a pipeline to notify one another of pending work to be performed.

One or more host interface processors (HIP's) 212 are also provided in engine 202 to handle the issue of work to software pipelines 204. One or more push buffers 214 are provided to interface each HIP 212 with a software application 216 and driver 218, which are resident outside of the engine. In order to initiate work in a pipeline, a software application 216 issues requests through an appropriate driver 218 in the form of API calls, which then generates appropriate requests for the HIP and stores the requests in a push buffer 214. The HIP 212 for the relevant pipeline pulls work requests off of push buffer 214 and initiates processing of the request by the associated pipeline.

In the illustrated embodiment, and as implemented on a NOC 102, a software pipeline 204 implements a function that is segmented into a set of modules or 'stages' of computer program instructions that cooperate with one another to carry out a series of data processing tasks in sequence. Each stage in a pipeline is composed of a flexibly configurable module of computer program instructions identified by a stage ID with each stage executing on a thread of execution on an IP block 104 of a NOC 102. The stages are flexibly configurable in that each stage may support multiple instances of the stage, so that a pipeline may be scaled by instantiating additional instances of a stage as needed depending on workload. Because each stage is implemented by computer program instructions executing on an IP block 104 of a NOC 102, each stage is capable of accessing addressed memory through a memory communications controller 106. At least one stage, moreover, is capable of sending network-address based communications among other stages, where the network-address based communications maintain packet order.

The network-address based communications, for example, may be implemented using "inboxes" in each stage that receive data and/or commands from preceding stages in the pipeline. The network-address based communications maintain packet order, and are communications of a same type which are able to flow through the same virtual channel as described above. Each packet in such communications is routed by a router 110 in the manner described above, entering and leaving a virtual channel buffer in sequence, in FIFO order, thereby maintaining strict packet order and preserving message integrity.

Each stage implements a producer/consumer relationship with a next stage. The first stage receives work instructions and work piece data through a HIP 212, carries out its designated data processing tasks on the work piece, produces output data, and sends the produced output data to the next stage in the pipeline, which consumes the produced output data from the first stage by carrying out its designated data processing tasks on the produced output data from the first stage, thereby producing output data that is subsequently sent on to a next stage in the pipeline. This sequence of operations continues to the last stage of the pipeline, which then stores its produced output data in an output data structure for eventual return through the HIP 212 to the originating application 216.

Figure 6:
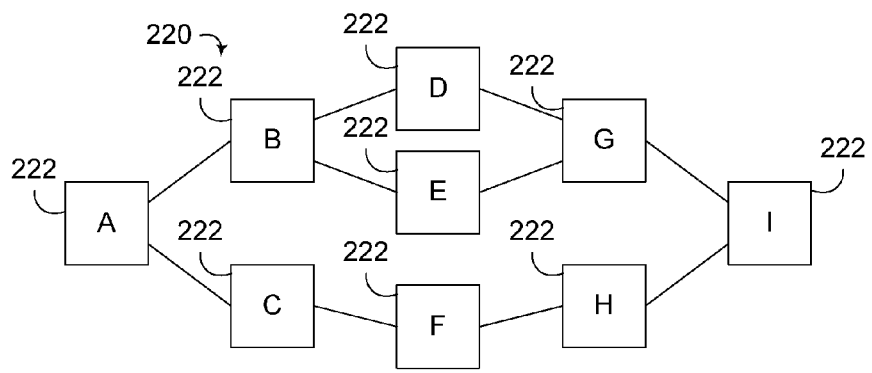
FIG. 6 is a block diagram of an exemplary software pipeline suitable for implementation in the thread pipelined software engine of FIG. 5.

The arrangement of stages in a pipeline may vary in different embodiments, as well as for performing different functions in different applications. FIG. 6, for example, illustrates an exemplary software pipeline 220 including a plurality of stage instances 222, also separately designated as instances A-I, each of which representing a thread of execution implemented on an IP block in NOC 102. The stage instances 222 are arranged in pipeline 220 into five stages, a first stage with instance A, a second stage with instances B and C, a third stage with instances D, E and F, a fourth stage with instances G and H, and a fifth stage with instance I. As can be seen from FIG. 6, instances may have a one-to-one, a one-to-many and/or a many-to-one relationship with other instances in the pipeline. Instances may operate collectively with one another in a particular stage to perform parallel tasks and share the workload, thus improving the overall throughput of the stage in performing the task. Instances in a stage may also perform different tasks from one another to enable the parallel performance of different tasks. Instances can supply data to more than one instance, while other instances may collect data and process data from multiple instances.

In the illustrated embodiment, each instance of each stage of a pipeline is typically implemented as an application-level module of computer program instructions executed on a separate IP block on a NOC, and each stage is assigned to a thread of execution on an IP block of a NOC. Each stage is assigned a stage ID, and each instance of a stage is assigned an identifier. HIP 212 (FIG. 5) typically sets up the pipeline by configuring each stage with a desired number of instances, with the network location of each instance of each stage provided to other instances of other stages to enable each instance to send its resultant workload to the proper instance in the next stage. Multiple instances may be assigned to a particular stage to provide additional processing resources relative to other stages, e.g., so work flows through the pipeline as efficiently as possible, and no single stage presents a bottleneck to performance. It will also be appreciated that workload monitoring may be performed during runtime, and that instances may be dynamically added or removed from a stage as needed for balancing the load among the stages of the pipeline.

Each stage is configured with a stage ID for each instance of a next stage, which may also include the number of instances in the next stage as well as the network location of each instance of that. Configuring a stage with IDs for instances of a next stage provides the stage with the information needed to carry out load balancing across stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a separate monitoring application that in turn is installed and running on another thread of execution on an IP block or HIP. Performance statistics can include, for example, time required to complete a data processing task, a number of data processing tasks completed within a particular time period, and so on, as will occur to those of skill in the art. Instantiating a number of instances of each stage in dependence upon the performance of one or more of the stages can be carried out by instantiating, by an HIP, a new instance of a stage when monitored performance indicates a need for a new instance.

Figure 7:
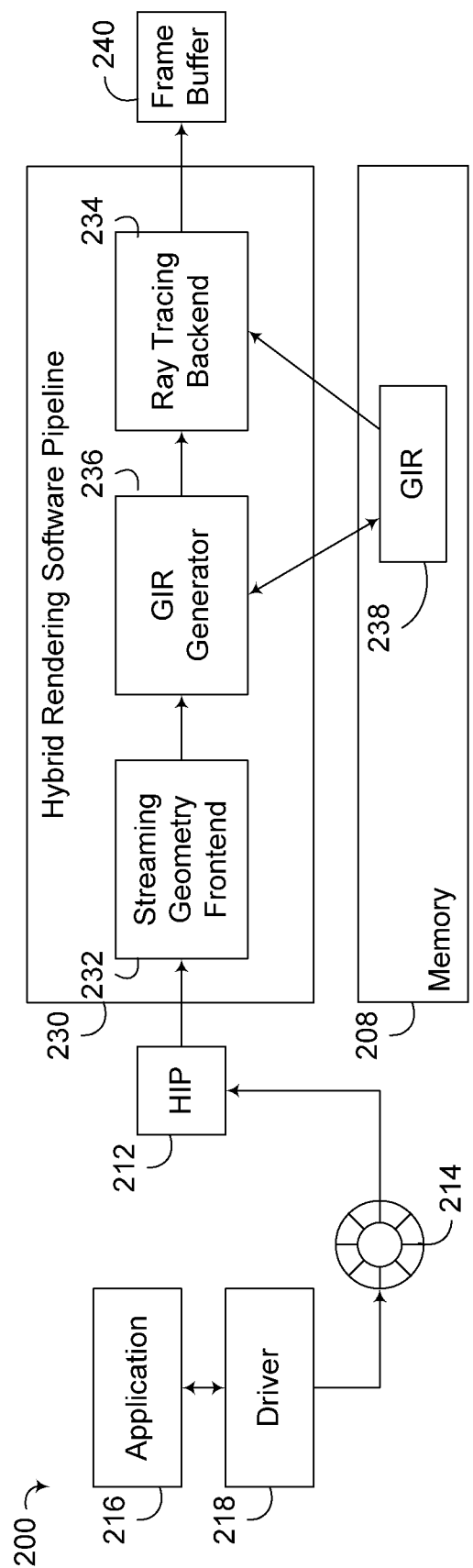
FIG. 7 is a block diagram of an exemplary rendering software pipeline consistent with the invention, and suitable for implementation in the thread pipelined software engine of FIG. 5.

It will be appreciated that a software pipeline configured in the manner described herein can be utilized to implement practically any type of data processing workload. For the purposes of explanation, and by way of example, FIG. 7 illustrates an implementation of processing unit 200 configured to implement a hybrid rendering architecture, e.g., as may be used in image processing to display 3D graphics on a computer display. In particular, FIG. 7 illustrates a hybrid rendering software pipeline 230 incorporating a streaming geometry frontend 232 interfaced with a ray tracing backend 234 via a GIR generator 236. Streaming geometry frontend 232 may be implemented, for example, as an OpenGL or DirectX compatible frontend, e.g., as is used in a number of different raster-based techniques, that streams a set of primitives for a scene. Frontend 232 also may natively support the OpenGL or DirectX API's, and as such, may be accessed by an application 216 developed for use with a raster-based rendering algorithm via API calls that are converted by driver 218 into work requests, which are sent to HIP 212 via push buffer 214 to initiate implementation of those API calls by frontend 232.

GIR generator 236, in turn, processes the stream of primitives output by streaming geometry frontend 232 to dynamically generate and store a geometry internal representation (GIR) data structure 238 in memory 208. GIR 238 functions as an accelerated data structure, and as such is used by ray tracing backend 234 to render a frame of image data for a scene to a frame buffer 240. GIR generator 236 dynamically generates the GIR 238 using a plurality of parallel threads of execution, and as such, reduces the likelihood of GIR generation serving as a bottleneck on overall performance. In addition, if desired, backend 234 is permitted to begin accessing the GIR 238 in parallel with the GIR generator 236 dynamically building the GIR 238, and prior to the GIR generator 236 completing the GIR 238. As an alternative, backend 234 may not operate on the GIR 238 until after construction of the GIR 238 is complete. As yet another alternative, frontend 232 and backend 234 may operate on different frames of data, such that frontend 232 streams primitive data to GIR generator 236 to build a GIR 238 for one frame while backend 234 is processing the GIR 238 for an earlier generated frame.

So configured, streaming frontend 232, GIR generator 236 and ray tracing backend 234 are each amenable to execution by a plurality of parallel threads of execution. Furthermore, GIR generator 236 serves to adapt the output of a streaming geometry frontend, ordinarily configured for use with a raster-based backend, for use with a physical rendering backend such as a ray tracing or photon mapping backend. As such, the same API as would be used for a raster-based rendering technique may be repurposed for physical rendering, often without requiring changes to the API or to an application that makes calls to the API.

Priority-Based Inter-Thread Communication

Figure 8A:
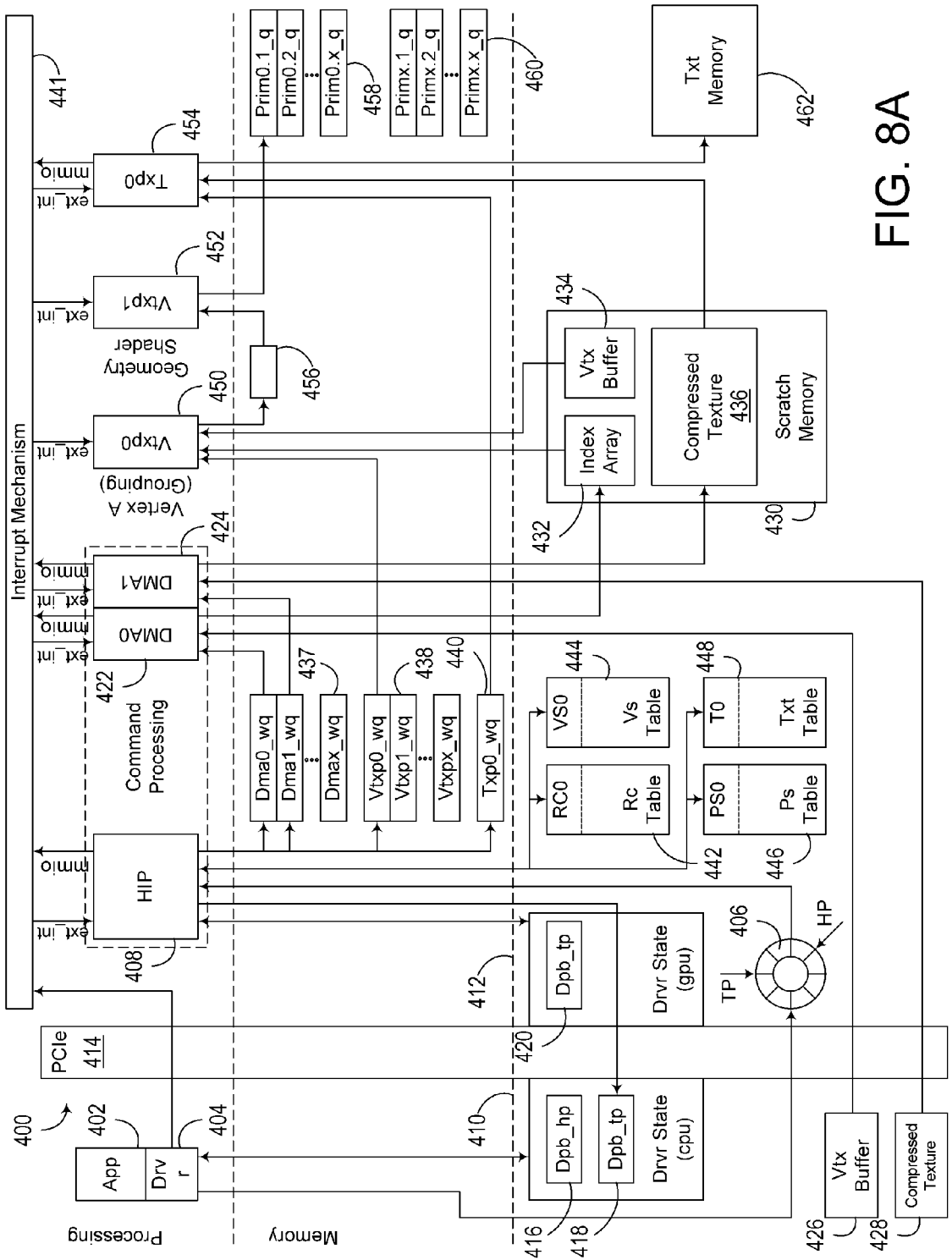
FIG. 8A and FIG. 8B collectively illustrate in greater detail an implementation of the rendering software pipeline of FIG. 7.

As noted above, a workload processed by a multithreaded processor may be processed by a plurality of hardware threads through the use of priority-based message selection consistent with embodiments of the invention. An exemplary implementation of a software pipeline to implement the aforementioned hybrid rendering functionality, as well as the herein-described priority-based message selection is illustrated at 400 in FIG. 8A and FIG. 8B. FIG. 8A, in particular primarily illustrates the frontend aspects of the architecture, while FIG. 8B primarily illustrates the backend aspects of the architecture. Software pipeline 400 is implemented by a NOC resident in a graphics processor unit (GPU) coupled to a host processor (CPU) via a bus, e.g., a PCI express bus 414.

As shown in FIG. 8A, an application 402 utilizes a driver 404 to submit work requests to the software pipeline via a push buffer 406. Application 402 and driver 404 are executed on the CPU, while push buffer 406 is resident in shared memory accessible to both the CPU and the GPU. Work requests are pulled from push buffer 406 by command processing logic, and in particular a host interface processor (HIP) 408. In addition, driver state information is maintained in allocated memory 410, 412 in the CPU and GPU, respectively. The states of the push buffer head and tail pointers for push buffer 406 are maintained at 416 and 418 in memory 410 while the state of the tail pointer is maintained at 420 in memory 420.

HIP 408 sets up the software pipeline, assigns threads of execution to stage instances in the pipeline, issues work requests to the pipeline, and monitors workflow to dynamically reallocate threads of execution to different stages of the pipeline to maximize throughput and minimize bottlenecks. In this regard, HIP 408, which is itself typically implemented in an IP block from a NOC, assigns one or more IP blocks to handle each stage of the pipeline, as well as other supporting logic that may be required to manage operation of the pipeline. A thread of execution in this regard constitutes a hardware thread implemented within an IP block, it being understood that in IP blocks that support multiple hardware threads, multiple stage instances in a pipeline may be assigned to different threads in the same IP block.

Examples of supporting logic include DMA engines 422, 424, which are respectively used to DMA vertex data from a vertex buffer 426 and compressed texture data from a texture data buffer 428. A scratch memory 430, including an index array 432, vertex buffer 434 and compressed texture data 436, serves as a destination for DMA engines 422, 424. HIP 408 sets up a set of inboxes 437 in DMA engines 422, 424 to receive work requests from the HIP 408. In some embodiments, one inbox 437 is provided for each DMA engine activated in the pipeline.

An interrupt mechanism 441 is used in software pipeline 400 to enable inter-node communication between logical units in the pipeline. Nodes, e.g., HIP 408 and DMA engines 422, 424, receive interrupts from mechanism 441, and are capable of issuing interrupts to other nodes via memory mapped input/output (MMIO) requests issued to the interrupt mechanism 441.

The frontend of pipeline 400 is implemented by a vertex processor including a first unit 450 configured as a grouper and a second unit 452 configured as a geometry shader, and a texture processor 454.

HIP 408 initiates work in the vertex processor 450, 452 and texture processor 454 using inboxes 438, 440. At least one inbox 438 is allocated for each unit in the vertex processor, and at least one inbox 440 is allocated for each unit in texture processor 454. In addition, HIP is capable of writing data to a render context table 442, vertex sort table 444, primitive sort table 446 and texture context table 448. Vertex processor unit 450 selects messages from the inbox 438, and is responsive to the selected messages to retrieve working data from index array 432 and vertex buffer 434. Unit 450 communicates with vertex processor unit 452 via an inbox 456 and unit 452 outputs messages to an array of inboxes 458, 460. Texture processor 454 selects messages from an inbox 440, reads texture data 436 from scratch memory 430 and outputs to a texture memory 462.

Figure 8B:
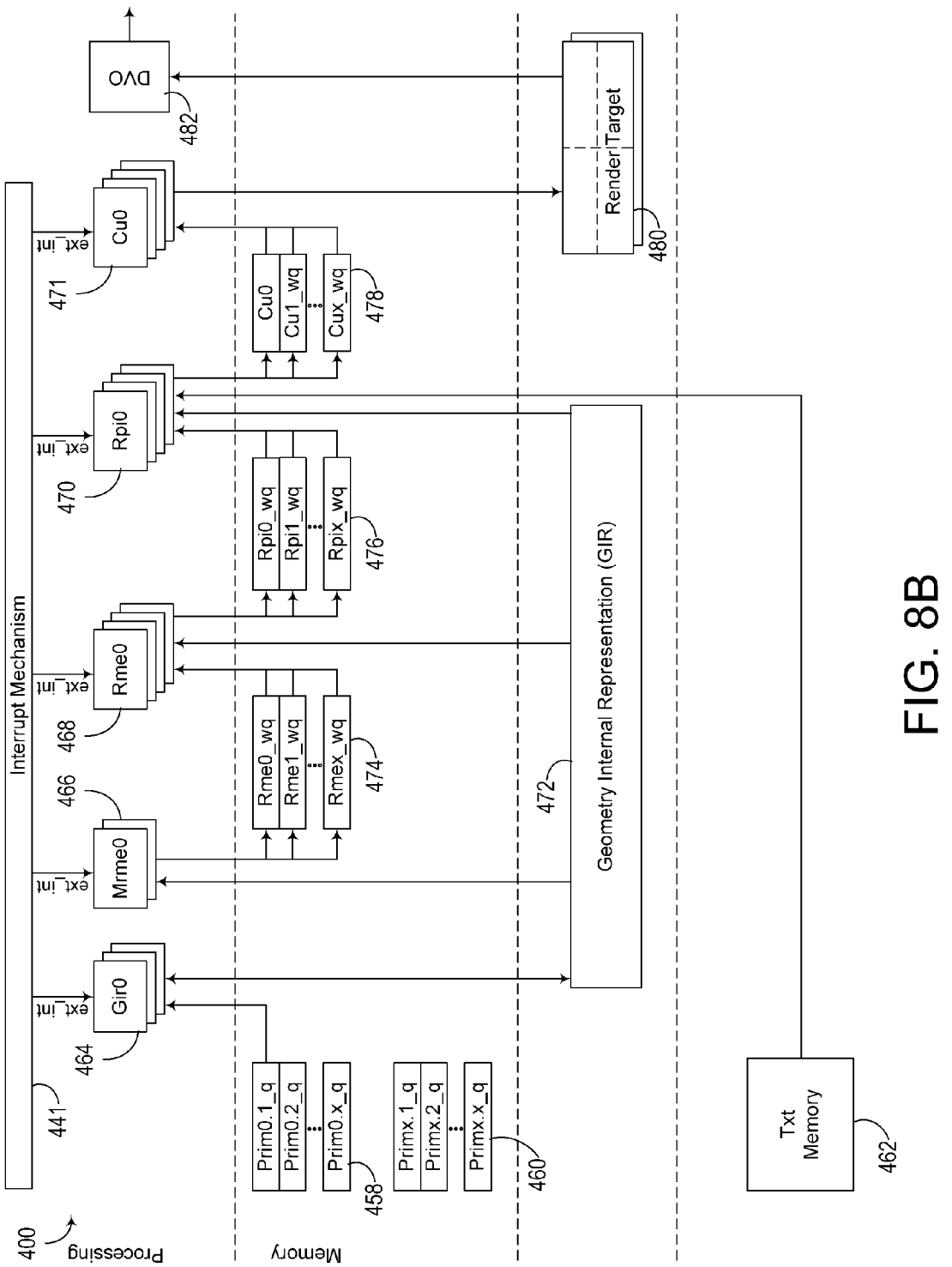

As shown in FIG. 8B, a set of inboxes 458, 460 is allocated for each of a plurality of GIR generator elements 464 that collectively implement a GIR generator, enabling the frontend of the pipeline to provide primitive data for use in building a GIR 472. As noted above, a plurality of parallel threads of execution, e.g. one or more per element 464, is used to generate the GIR in the manner described above.

One or more master ray management elements 466, one or more ray management elements 468, one or more ray primitive intersect elements 470 and one or more color update elements 471 respectively implement a ray tracing backend. A variable number of threads of execution may be allocated for each type of element 466, 468, 470, 471 in order to optimize throughput through the software pipeline. Elements 466, 468 and 470 use the GIR 472 to perform ray tracing operations, while elements 470 retrieve texture data from texture memory 462. Communication between stages of the backend is provided by inboxes 474, 476 and 478, respectively allocated to elements 468, 470 and 471. Color update elements 471 output image data to a render target 480, e.g., an image buffer, which is then output via digital video out circuit 482.

Figure 9A:
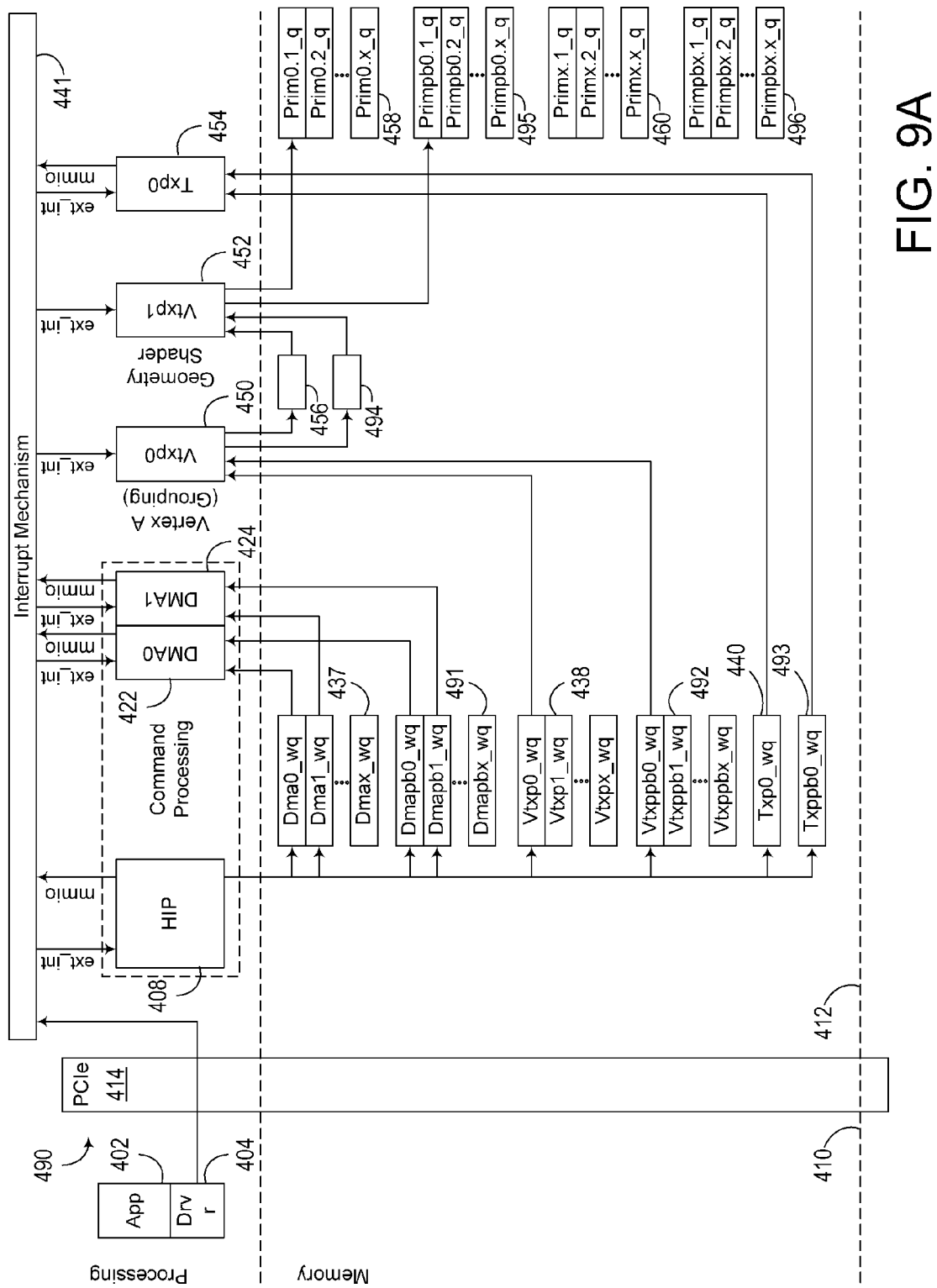
FIG. 9A and 9B collectively illustrate in greater detail an alternative implementation of the rendering software pipeline of FIG. 7.
Figure 9B:
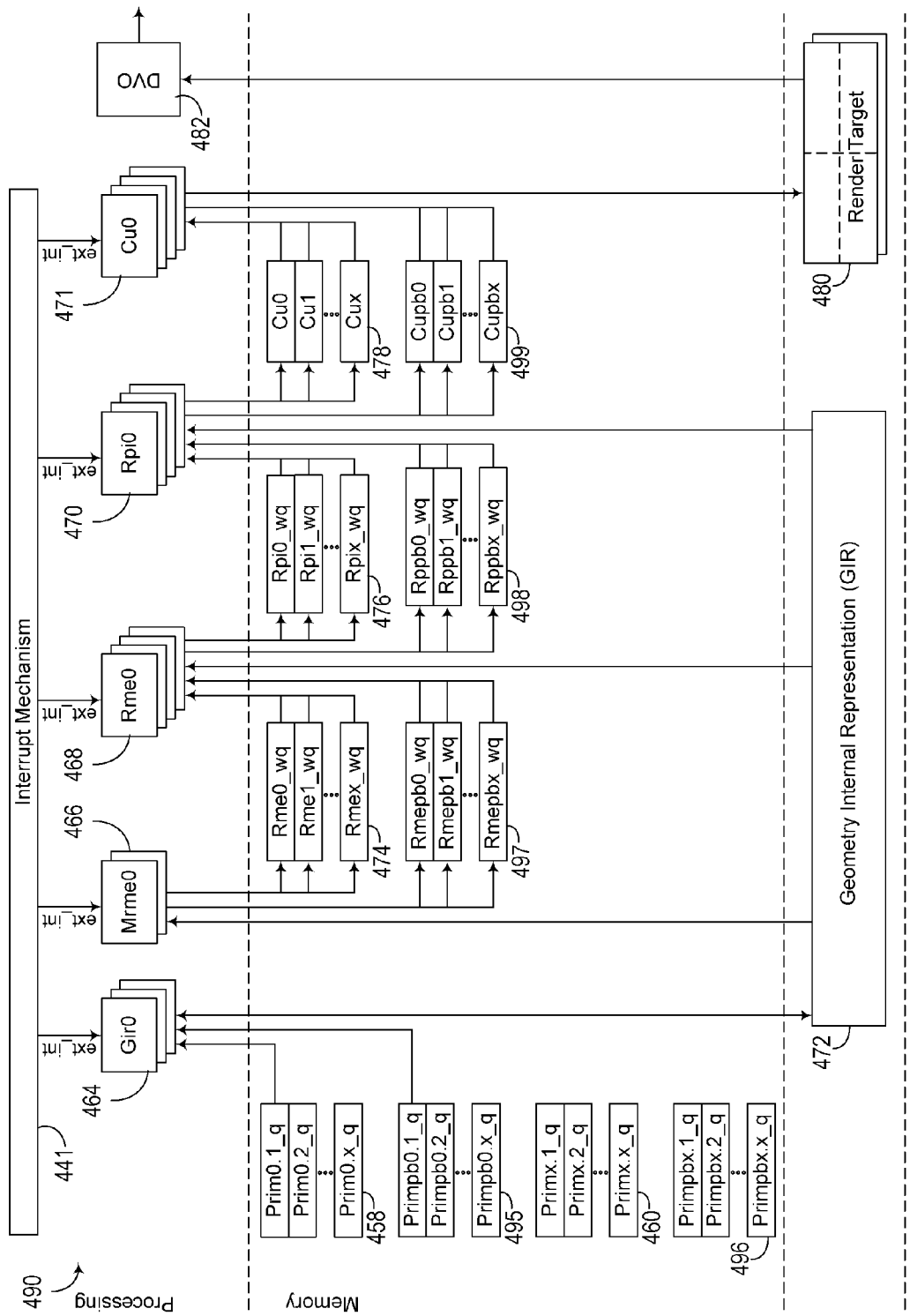

Implementation of an alternative embodiment of a software pipeline to implement the aforementioned hybrid rendering functionality is illustrated at 490 in FIG. 9A and FIG. 9B. In some embodiments, the pipeline 490 includes substantially all the components of the pipeline 400 illustrated in FIG. 8A and 8B, while the pipeline 490 additionally includes a plurality of inboxes configured to receive prioritized messages, otherwise referred to as "priority message buffers" 491, 492, 493, 494, 495, 496, 497, 498, and/or 499. As the pipeline 490 includes substantially all the components of the pipeline 400 illustrated in FIG. 8A and 8B, only a portion of pipeline 490 is illustrated.

In some embodiments, pipeline 490 may be utilized when at least a portion of the messages to hardware threads (e.g., hardware threads of the NOC, and in specific examples hardware threads of the NOC operating as DMA engines 422, 424, vertex units 450, 452, texture processor 454, GIR generator elements 464, ray management elements 468, ray primitive intersect elements 470, color update elements 471, and/or other nodes, components, and/or configurations) are prioritized. As such, the hardware threads may be respectively configured with inboxes 437, 438, 440, 456, 458, 460, 474, 476, and/or 478 as well as priority message buffers 491, 492, 493, 494, 495, 496, 497, 498, and/or 499. In some embodiments, the inboxes 437, 438, 440, 456, 458, 460, 474, 476, and/or 478 are configured to receive messages that do not include a priority, while the priority message buffers 491, 492, 493, 494, 495, 496, 497, 498, and/or 499 are configured to receive messages that include a priority. Thus, the priority message buffers 491 may be configured to receive a plurality of prioritized messages from the HIP 408 and at least one priority message buffer 491 may be configured for each DMA engine 422, 424. Similarly, the priority message buffers 492 may be configured to receive a plurality of prioritized messages from the HIP 408 and at least one priority message buffer 492 may be configured for each first vertex unit 450, the priority message buffers 494 may be configured to receive a plurality of prioritized messages from the DMA engines 422, 424 and at least one priority message buffer 494 may be configured for each second vertex unit 452, the at least one priority message buffer 493 may be configured to receive a plurality of prioritized messages from the HIP 408 and may have a message from that plurality of prioritized messages selected by the texture processor 454, the priority message buffers 495 and/or 496 may be configured to receive a plurality of prioritized messages from the second vertex units 452 and at least one priority message buffer 495 and/or 496 may be configured for each GIR generator element 464, the priority message buffers 497 may be configured to receive a plurality of prioritized messages from the master ray management elements 466 and at least one priority message buffer 497 may be configured for each ray management element 468, the priority message buffers 498 may be configured to receive a plurality of prioritized messages from the ray management element 468 and at least one priority message buffer 498 may be configured for each ray primitive intersect element 470, and/or the priority message buffers 499 may be configured to receive a plurality of prioritized messages from the ray primitive intersect elements 470 and at least one priority message buffer 499 may be configured for each color update element 471.

The HIP 408 provides hardware threads with messages and/or prioritized messages through their respective inboxes and/or priority message buffers for processing consistent with embodiments of the invention. In particular, messages (e.g., messages that include a priority as well as messages that do not include a priority) may be sent from IP block 104 to IP block 104 through the routers 110 to network interface controllers 108 and/or memory communication controllers 106. Specifically, the messages may be selected by the thread fetch sequencers 174 and provided from respective instruction buffers 168 to respective SMT hardware threads of the XU 164. As such, at least a portion of the hardware threads of the NOC may be configured as DMA engines 422, 424, vertex units 450, 452, texture processor 454, GIR generator elements 464, ray management elements 468, ray primitive intersect elements 470, the color update elements 471, and/or other hardware threads of the NOC. The messages and/or prioritized messages for the DMA engines 422, 424, vertex units 450, 452, texture processor 454, GIR generator elements 464, ray management elements 468, ray primitive intersect elements 470, color update elements 471, and/or other hardware threads may include data, such as commands and/or instructions, to process at least a portion of a workload.

Thus, hardware threads of the NOC may be configured to select messages and/or prioritized messages from their respective inboxes 437, 438, 440, 456, 458, 460, 474, 476, and/or 478 (collectively, "inboxes") and/or priority message buffers 491, 492, 493, 494, 495, 496, 497, 498, and/or 499 (collectively, "priority message buffers"), and specifically through the various routers 110, network interface controllers 108, and memory communication controllers 106 of the NOC. As such, each of the inboxes and/or priority message buffers may be configured as a circular queue based system that provides respective messages and/or prioritized messages to a respective hardware thread.

For example, the HIP 408 may provide a plurality of messages to at least one thread of the DMA engines 422, 424 through inboxes 437, the HIP 408 may provide a plurality of messages to at least one thread of the first vertex units 450 through inboxes 438, at least one thread of the first vertex units 450 may provide a plurality of messages to at least one thread of the second vertex units 452 through inboxes 456, the HIP 408 may provide a plurality of messages to the texture processor 454 through inbox(es) 440, at least one thread of the second vertex unit 452 may provide a plurality of messages to at least one thread of the GIR generator elements 464 through inboxes 458, 460, at least one thread of the master ray management elements 466 may provide a plurality of messages to at least one thread of the ray management elements 468 through inboxes 474, at least one thread of the ray management elements 468 may provide a plurality of messages to at least one thread of the ray primitive intersect elements 470 through inboxes 476, and/or at least one thread of the ray primitive intersect elements 470 may provide a plurality of messages to at least one thread of the color update elements 471 through inboxes 478. Also for example, the HIP 408 may provide a plurality of prioritized messages to at least one thread of the DMA engines 422, 424 through priority message buffers 491, the HIP 408 may provide a plurality of prioritized messages to at least one thread of the first vertex units 450 through priority message buffers 492, at least one thread of the first vertex units 450 may provide a plurality of prioritized messages to at least one thread of the second vertex units 452 through priority message buffers 494, the HIP 408 may provide a plurality of prioritized messages to the texture processor 454 through priority message buffers 493, at least one thread of the second vertex unit 452 may provide a plurality of prioritized messages to at least one thread of the GIR generator elements 464 through priority message buffers 495, 496, at least one thread of the master ray management elements 466 may provide a plurality of prioritized messages to at least one thread of the ray management elements 468 through priority message buffers 497, at least one thread of the ray management elements 468 may provide a plurality of prioritized messages to at least one thread of the ray primitive intersect elements 470 through priority message buffers 498, and/or at least one thread of the ray primitive intersect elements 470 may provide a plurality of prioritized messages to at least one thread of the color update elements 471 through priority message buffers 499.

When a hardware thread, or a plurality of hardware threads, attempt to communicate a plurality of messages (e.g., prioritized or not) to a first hardware thread, this may cause a backup in an inboxes and/or priority message buffers associated with that hardware thread. In specific examples, this backup may occur when that first hardware thread is the start of a feedback loop. As such, embodiments consistent with the invention select a first message for that first hardware thread based on the priority of that first message having a highest priority among the messages and select a second message based on that second message having the earliest timestamp among the received messages. In some embodiments, both the first and second messages may be selected from an inbox associated with that first hardware thread, while in alternative embodiments the first messages is selected from a priority message buffer associated with the first hardware thread and the second message is selected from the inbox or priority message buffer associated with that first hardware thread, respectively. It will occur to one having ordinary skill in the art that the process of selecting messages based on priority and selecting messages based on timestamp may be alternated indefinitely, or for selective periods of time.

Figure 10:
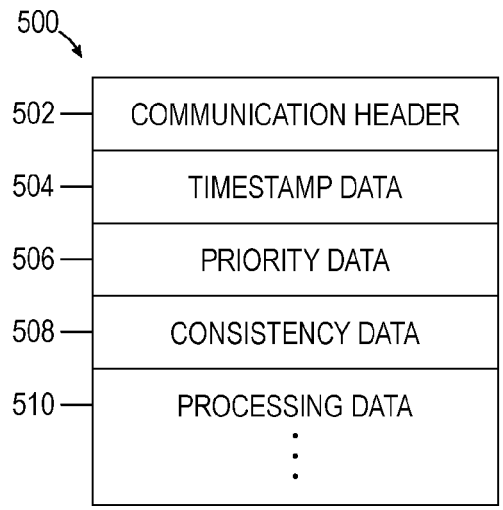
FIG. 10 is a diagrammatic illustration of one embodiment of a message that carries data to be processed by a hardware thread consistent with embodiments of the invention.

FIG. 10 is a diagrammatic illustration of one embodiment of at least a portion a message 500 that may be provided to an inbox and/or a priority message buffer associated with a respective hardware thread for that hardware thread to process at least a portion of a workload consistent with embodiments of the invention. As illustrated, the message 500 may include a communication header 502, timestamp data 504, priority data 506, consistency data 508, and/or processing data 510 for at least one hardware thread. One having ordinary skill in the art will appreciate that the message 500 may include additional data without departing from the scope of the invention. In some embodiments, the communication header 502 may indicate to which hardware thread, and thus which inbox and/or priority message buffer, the message 500 is intended. For example, the NOC may include a plurality of DMA engines 422, 424 and thus a message 500 from the HIP 408 may be directed to any of the plurality of inboxes 438 or the plurality of priority message buffers 491 associated with those DMA engines 422, 424. As such, the communication header 502 may specify which of the plurality of inboxes 438 and/or priority message buffers 491, and thus which of the DMA engines 422, 424, may be the recipient of the message 500.

The timestamp data 504 may be appended to the message 500 as it is placed in an outbox of a hardware thread and/or as it is received in an inbox and/or priority message buffer. The timestamp data 504 may include data indicating the minute, second, millisecond, microsecond, nanosecond, picosecond, and/or combinations thereof of the NOC at the time of the timestamp. Similarly, the priority data 506 may be appended to the message 500 before it is sent and/or as it is placed in an outbox of a hardware thread. The priority data 506 may include one or more bits to indicate the priority of the message 500.

In some embodiments, the consistency data 508 indicates a particular software component, hardware component, application, task, and/or portion of a task the message 500 is associated with. Additionally, the consistency data 508 may include an indication of which hardware thread the message 500 is from, and/or to which hardware thread the results of processing the message 500 may proceed after processing. In turn, the processing data 510 includes data that may be utilized by the hardware thread to complete at least a portion of a workload. For example, the processing data 510 may indicate from which component of the software pipeline 400 or NOC the hardware thread is to retrieve data for that hardware thread to process as disclosed above.

Alternatively, a message 500 may not include the timestamp data 504 and priority data 506 illustrated in FIG. 10, and instead the communication header 502, consistent data 508, processing data 508, and/or other configuration data (not shown) may indicate a priority and a timestamp with which the message is associated. For example, the message 500 associated with a priority and a timestamp, but that priority and/or timestamp may not be appended to the message and rather be included in configuration data associated the message 500. More specifically, the configuration data may be included in the message 500 or otherwise accessible by a hardware thread to determine the priority and timestamp of the message 500. As such, a timestamp and/or priority data may be associated with a message 500 by being configured in the respective timestamp data 504 and priority data 506 of the message 500, by being configured in configuration data of the message, or by being configured in configuration data associated with that message 500 and accessible by a hardware thread to determine that timestamp and/or priority data.

Figure 11:
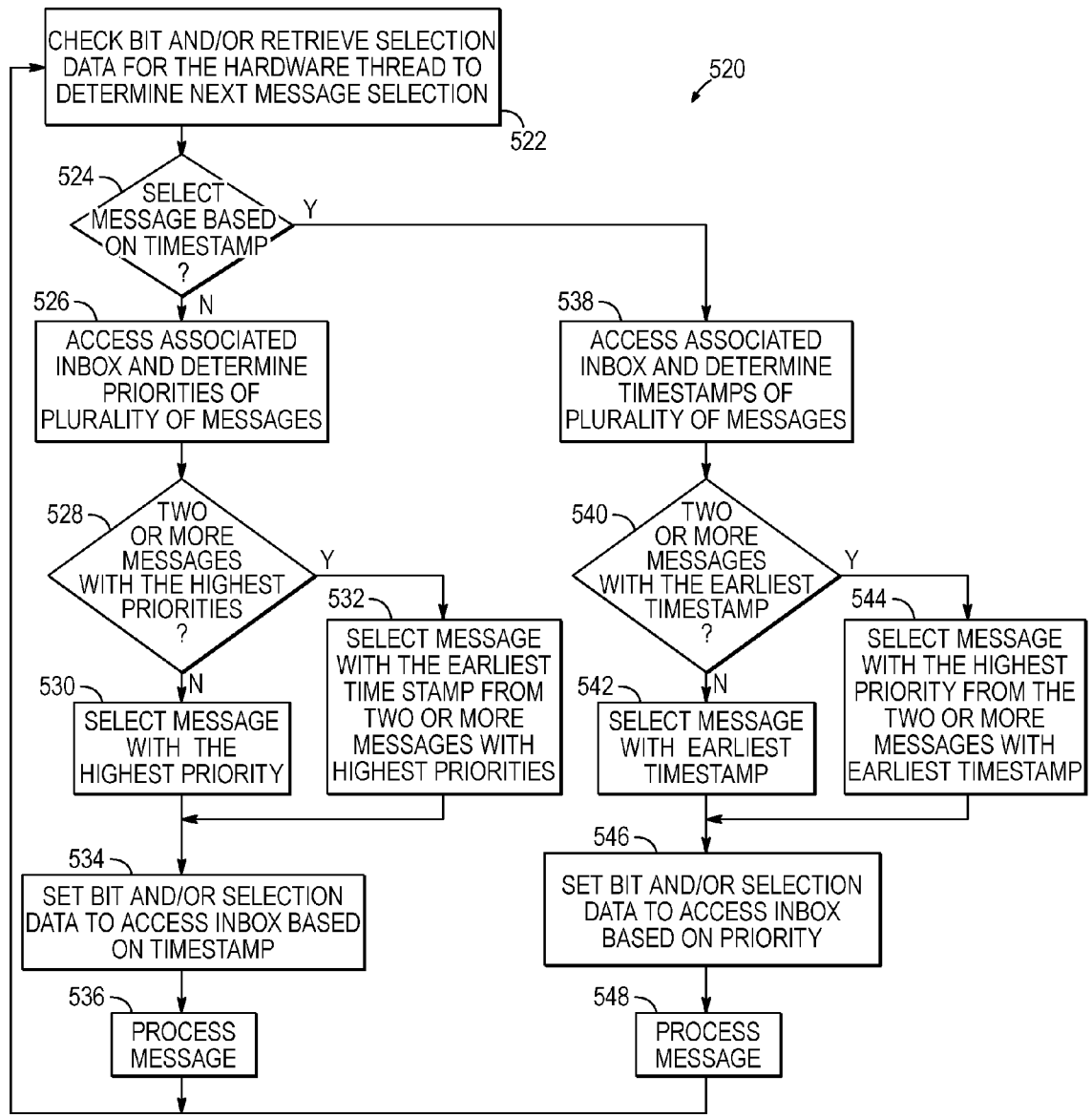
FIG. 11 is a flowchart illustrating a sequence of operations performed by a hardware thread configured to operate in the NOC of FIG. 2 to select messages to process.

FIG. 11 is a flowchart illustrating a sequence of operations 520 that may be performed by a hardware thread configured to operate in a NOC to select messages to process and implement inter-thread communication consistent with embodiments of the invention. More specifically, the sequence of operations 520 may be performed by hardware threads of the NOC that are not configured to communicate with priority message buffers. Thus, FIG. 11 illustrates a sequence of operations 520 to select a first message based on that first message's priority and selecting a second message based on that second message's timestamp from an inbox associated with that hardware thread. The sequence 520 may include an operation to determine whether to select a message based on a priority or based on a timestamp by determining whether a switch bit is set or cleared and/or by retrieving selection data for the hardware thread to determine whether to select the message based on a priority or based on a timestamp. In some embodiments, the switch bit (hereinafter, "bit") and/or the selection data for the hardware thread is associated with an indication of whether to select a message based on a priority or a timestamp. In specific embodiments, the bit and/or the selection data is configured in memory associated with the hardware thread, and may be configured in the inbox of the hardware thread, in a cache associated with the hardware thread, or in a dedicated portion of memory allocated exclusively for that bit. As such, the bit and/or selection data associated with the hardware thread may be accessed (block 522) and it may be determined, based on the bit and/or selection data, whether to select a message based on a timestamp or a priority (e.g., whether the bit is a logic "high" or when the selection data indicates to select a message based on a timestamp) (block 524). In specific embodiments, the hardware thread may snoop or otherwise capture the value of the bit and/or selection data (block 522) to determine whether that bit was set and/or that selection data indicated to select a message based on a timestamp (block 524). When it is determined to select a message based on a priority (e.g., the bit is a logic "low" or the selection data indicates to select a message based on a priority) ("No" branch of block decision 524), the respective inbox for the hardware thread may be accessed to determine a plurality of messages and respective priorities thereof (block 526).

In block 528, it may be determined whether the plurality of messages include two or more messages associated with the highest priority (e.g., not necessarily the highest priority assignable, but rather the highest priority of the plurality of messages). When the plurality of messages do not include two or more messages associated with the highest priority ("No" branch of decision block 528), a first message among the plurality of messages may be selected to process in the hardware thread based on that first message being associated with the highest priority among the plurality of messages (block 530). However, when the plurality of messages includes two or more messages associated with the highest priority ("Yes" branch of decision block 528), the first message among the plurality of messages may be selected to process based on that first message being associated with the earliest timestamp among the two or more messages with the highest priority (block 532). After selecting the first message, the bit may be set and/or the selection data may be set to indicate that the next message should be selected based on a timestamp (block 534) before processing the message (block 536).

Returning to block 524, when it is determined to select a message based on a timestamp ("Yes" branch of decision block 524) the inbox of the hardware thread may be accessed to determine the plurality of messages and respective timestamps thereof (block 538). An operation may then determine whether the plurality of messages includes two or more messages associated with the same earliest timestamp (block 540). When the plurality of messages do not include two or more messages associated with the same earliest timestamp ("No" branch of decision block 540), a second message among the plurality of message may be selected to process based on that second message being associated with an earliest timestamp among the plurality of messages (block 542). However, when the plurality of messages includes two or more messages associated with the same earliest timestamp ("Yes" branch of decision block 540), the second message among the plurality of messages may be selected to process based on that second message being associated with the highest priority among the two or more messages with the same earliest timestamp (block 544). After selecting the second message, the bit may be cleared and/or the selection data may be set to indicate that the next message should be selected based on a priority (block 546) before processing the message (block 548). After processing the message in either block 534 or block 548, the sequence of operations 520 may return to block 522.

It will be appreciated that in some embodiments of the invention a switch bit or selection data may not be accessed when determining whether to switch between selecting messages based on priority or based on timestamps. For example, the sequence of operations 520 detailed in FIG. 11 may omit blocks 522, 524, 534, and 546. As such, and in some alternative embodiments, block 538 follows directly from block 536 while block 526 follows directly from block 548. In this manner, a sequence of operations may alternate between selecting a message based on priority and based on timestamp.

Figure 12:
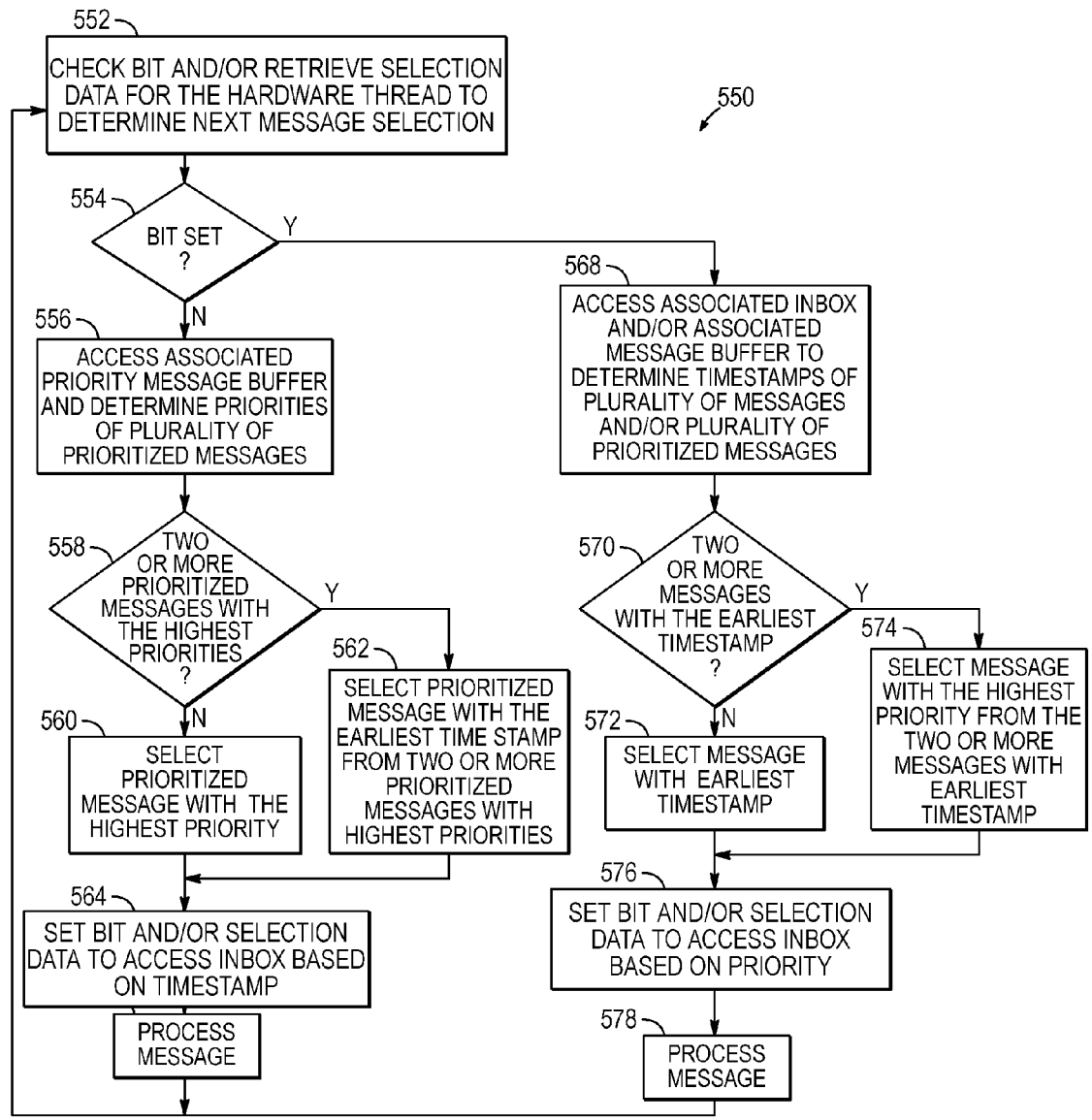
FIG. 12 is a flowchart illustrating a sequence of operations performed by a hardware thread configured to operate in the NOC of FIG. 2 to select messages to process consistent with alternative embodiments of the invention.

FIG. 12 is a flowchart illustrating a sequence of operations 550 that may be performed by a hardware thread configured to operate in a NOC to select messages to process and implement inter-thread communication consistent with alternative embodiments of the invention. More specifically, the sequence of operations 550 may be performed by hardware threads of the NOC that are configured to communicate with priority message buffers. Thus, FIG. 12 illustrates a sequence of operations 550 to select a first message based on that first message's priority from a priority message buffer associated with that hardware thread and select a second message from an inbox and/or a priority message buffer based on that second message's timestamp. Similarly to the sequence of operations 520 illustrated in FIG. 11, the sequence of operations 550 include an operation to determine whether to select a message based on a priority or based on a timestamp by determining whether a switch bit (hereinafter, "bit") is set or cleared and/or by retrieving selection data for the hardware thread to determine whether to select the message based on a priority or based on a timestamp. Thus, the bit and/or selection data associated with the hardware thread may be checked (block 552) and it may be determined, based on the bit and/or selection data, whether to select a message based on a timestamp or a priority (block 554). When it is determined to select a message based on a priority ("No" branch of block decision 554), the respective priority message buffer for the hardware thread may be accessed to determine the priorities of a plurality of prioritized messages (block 556).

In block 558, it may be determined whether the plurality of prioritized messages include two or more prioritized messages associated with the highest priority. When the plurality of prioritized messages do not include two or more prioritized messages associated with the highest priority ("No" branch of decision block 558), a first message among the plurality of prioritized messages may be selected to process based on that first message being associated with the highest priority among the plurality of prioritized messages (block 560). However, when the plurality of prioritized messages includes two or more prioritized messages associated with the highest priority ("Yes" branch of decision block 558), the first message among the plurality of prioritized messages may be selected to process based on that first message being associated with the earliest timestamp among the two or more prioritized messages associated with the highest priority (block 562). After selecting the first message the bit may be set and/or the selection data may be set to indicate that the next message should be selected based on a timestamp (block 564) before processing the message (block 566).

Returning to block 554, when it is determined to select a message based on a timestamp ("Yes" branch of decision block 554) the respective inbox and/or its priority message buffer of the hardware thread may be accessed to determine the respective plurality of messages and plurality of prioritized messages, as well as the timestamps thereof (block 568). An operation may then determine whether the plurality of messages and/or plurality of prioritized messages in the respective inbox and/or priority message buffer include two or more messages associated with the same earliest timestamp (block 570). When there are not two or more messages associated with the same earliest timestamp ("No" branch of decision block 570), a second message may be selected to process in the hardware thread based on that second message being associated with an earliest timestamp among the plurality of messages and/or the plurality of prioritized messages (block 572). However, when the plurality of messages and/or the plurality of prioritized messages include two or more messages associated with the same earliest timestamp ("Yes" branch of decision block 570), the second message may be selected to process in the hardware thread based on that second message being associated with the highest priority among the two or more messages with the same earliest timestamp (block 574). After selecting the second message, the bit may be cleared and/or the selection data may be set to indicate that the next message should be selected based on a priority (block 576) before processing the message (block 578). After processing the message in either block 564 or block 578, the sequence of operations 550 may return to block 552 before selecting another message.

It will be appreciated that in some embodiments of the invention a switch bit may not be accessed when determining whether to switch between selecting messages based on priority from the priority message buffer or based on timestamps from the inbox. For example, the sequence of operations 550 detailed in FIG. 12 may omit blocks 552, 554, 564, and 566. As such, and in some alternative embodiments, block 568 follows directly from block 566 while block 556 follows directly from block 578. In this manner, a sequence of operations may alternate between selecting a message based on priority from the priority message buffer and based on timestamp from the inbox and/or priority message buffer.

Figure 13:
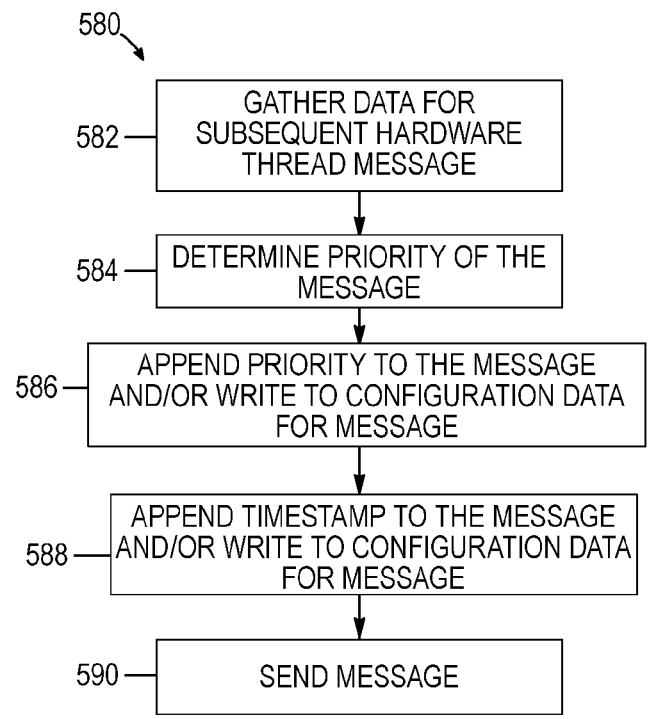
FIG. 13 is a flowchart illustrating a sequence of operations performed by the hardware thread configured to operate in the NOC of FIG. 2 to send a message.

FIG. 13 is a flowchart illustrating a sequence of operations 580 that may be performed by a hardware thread configured to operate in a NOC to timestamp and prioritize messages. In particular, the sequence of operations 580 may be executed by a first hardware thread after processing a message but before a new message is sent to an inbox and/or priority message buffer of a second hardware thread. For example, blocks of sequence of operations 580 may be executed by hardware threads of the pipeline 400 illustrated in FIG. 8A and 8B or the pipeline 490 illustrated in FIG. 9A and 9B. Returning to FIG. 13, data may be gathered for a subsequent hardware thread to process in a message (block 582) and the priority of the message may be determined (block 584). In some embodiments, the priority may be determined by determining the type of task associated with the data, an application associated with the data, the hardware thread gathering the data, the subsequent hardware thread to process the message, a subsequent priority associated with the subsequent hardware thread, a user, and/or another association. After determining the priority, the priority may be appended to the message and/or written to configuration data associated with that message (block 586) and, in an optional step, a timestamp may be appended to the message and/or written to configuration data for the message (block 588). The message may then be sent to the inbox and/or the priority message buffer associated with the second hardware thread (block 590). Although not illustrated, one having ordinary skill in the art will appreciate that the configuration data may be sent to the second hardware thread at the same time that the message is sent to the inbox and/or priority message buffer in block 590.

Figure 14:
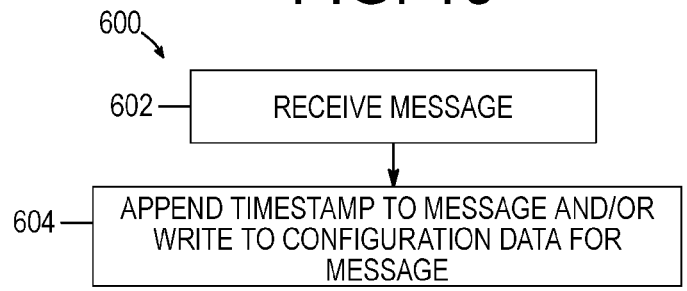
FIG. 14 is a flowchart illustrating a sequence of operations to timestamp a message in the NOC of FIG. 2.

In some embodiments, the hardware threads are not configured to append timestamps to messages before those messages are sent. FIG. 14 is a flowchart illustrating a sequence of operations 600 that may be performed in a NOC to timestamp messages consistent with embodiments of the invention. The sequence of operations 60 may be performed by one or more inboxes and/or priority message buffers associated with a hardware thread of the NOC. In particular, the sequence of operations 600 illustrates that an inbox and/or priority message buffer may receive a message (block 602) and, in response to receiving that message, append a timestamp to the message and/or write the timestamp to configuration data associated with the message (block 604). In this manner, a hardware thread associated with that inbox may select a message based at least in part on that timestamp.

It will be appreciated that the implementation embodiments of the invention described herein would be well within the abilities of one of ordinary skill in the art having the benefit of the instant disclosure. It will also be appreciated that embodiments of the invention may be used to select messages in other types of architectures, such as in hardware pipelines, software pipelines, work distribution algorithms, additional circumstances in which multiple hardware threads are used to process a task, and/or combinations thereof. Moreover, it will be appreciated that embodiments of the invention may be used without software pipelining or hardware pipelining without departing from the scope of the invention.

Therefore, embodiments consistent with the invention enable improved inter-thread communication by selecting from among a plurality of messages in an inbox and/or in a priority message buffer a first message based on the priority of the plurality of messages, then selecting a second message based upon the timestamps of the plurality of messages.

Various modifications may be made without departing from the scope of the invention. Therefore, the invention lies in the claims hereinafter appended.

What is claimed is:

1. A method of processing a workload in a multithreaded processor of the type that includes a plurality of hardware threads, each of the plurality of hardware threads configured to receive at least one message carrying data to process the workload through a respective inbox from among a plurality of inboxes, the method comprising:

receiving a plurality of messages at a first inbox among the plurality of inboxes, wherein the first inbox is associated with a respective first hardware thread among the plurality of hardware threads, and wherein each of the plurality of messages includes a priority associated therewith; and alternating between selecting messages based on time stamp and selecting messages based on priority, including:

from the plurality of received messages, and while selecting messages based on priority, selecting a first message among the plurality of received messages to process in the first hardware thread based on the first message being associated with a highest priority among the plurality of received messages;

in response to processing the first message, switching from selecting messages based on priority to selecting messages based on time stamp;

after selecting the first message, and while selecting messages based on time stamp, selecting a second message among the plurality of messages to process in the first hardware thread based on the second message being associated with an earliest time stamp among the plurality of received messages;

in response to processing the second message, switching from selecting messages based on time stamp to selecting messages based on priority; and after selecting the second message, and while selecting messages based on priority, selecting a third message among the plurality of received messages to process in the first hardware thread based on the third message being associated with a highest priority among the plurality of received messages.

2. The method of claim 1, wherein selecting the first message based on the first message being associated with the highest priority among the plurality of received messages includes:

determining that two or more messages among the plurality of messages are associated with the highest priority among the plurality of received messages; and selecting the first message among the two or more messages to process in the first hardware thread based on the first message being associated with an earliest time stamp among the two or more messages.

3. The method of claim 1, wherein selecting the second message based on the second message being associated with the earliest time stamp among the plurality of received messages includes:

determining that two or more messages among the plurality of messages are associated with the earliest time stamp; and selecting the second message among the two or more messages to process in the first hardware thread based on the second message being associated with the highest priority among the two or more messages.

4. The method of claim 1, further comprising:

configuring the first hardware thread to process at least a portion of a software pipeline.

5. A method of processing a workload in a multithreaded processor of the type that includes a plurality of hardware threads, each of the plurality of hardware threads configured to receive at least one prioritized message carrying data to process the workload through a respective priority message buffer from among a plurality of priority message buffers, each of the plurality of hardware threads configured to receive at least one message carrying data to process the workload through a respective inbox from among a plurality of inboxes, the method comprising:

receiving a plurality of prioritized messages at a first priority message buffer among the plurality of priority message buffers, wherein the first priority message buffer is associated with a respective first hardware thread among the plurality of hardware threads, and wherein each of the prioritized messages includes a priority associated therewith;

receiving a plurality of messages at a first inbox among the plurality of inboxes, wherein the first inbox is associated with the first hardware thread, and wherein each of the plurality of messages does not include a priority associated therewith; and alternating between selecting messages based on time stamp and selecting messages based on priority, including:

from the plurality of received prioritized messages, and while selecting messages based on priority, selecting a first prioritized message among the plurality of received prioritized messages to process in the first hardware thread based on the first prioritized message being associated with a highest priority among the plurality of received prioritized messages;

in response to processing the first prioritized message, switching from selecting messages based on priority to selecting messages based on time stamp;

after selecting the first prioritized message, while selecting messages based on time stamp, and while at least one received prioritized message among the plurality of received prioritized messages awaits processing by the first hardware thread, selecting a first message among the plurality of received messages and the plurality of received prioritized messages to process in the first hardware thread based on the first message being associated with an earliest time stamp among the plurality of received messages and the plurality of received prioritized messages; and in response to processing the first message, switching from selecting messages based on time stamp to selecting messages based on priority.

6. The method of claim 5, wherein selecting the first prioritized message based on the first message prioritized being associated with the highest priority among the plurality of received prioritized messages includes:

determining that two or more prioritized messages among the plurality of prioritized messages are associated with the highest priority among the plurality of received prioritized messages; and selecting the first prioritized message among the two or more prioritized messages to process in the first hardware thread based on the first prioritized message being associated with an earliest time stamp among the two or more prioritized messages.

7. The method of claim 5, wherein selecting the first message based on the first message being associated with an earliest time stamp among the plurality of received messages and the plurality of received prioritized messages includes:

determining that two or more messages among the plurality of received messages and the plurality of received prioritized messages are associated with the earliest time stamp; and selecting the first message among the two or more messages to process in the first hardware thread based on the first message being associated with the highest priority among the two or more messages.

8. The method of claim 7, wherein the first message is a second prioritized message.

9. The method of claim 5, further comprising:

configuring the first hardware thread to process at least a portion of a software pipeline.

10. A circuit arrangement, comprising:

a plurality of hardware threads configured to process a workload and disposed in at least one processor;

a plurality of inboxes in communication with the respective plurality of hardware threads, each of the plurality of inboxes configured to receive a plurality of messages; and control logic disposed in each of the plurality of hardware threads and configured to, during processing of at least a portion of the workload in a first hardware thread among the plurality of hardware threads, alternate between selecting messages based on time stamp and selecting messages based on priority, wherein the control logic is configured to alternate between selecting messages based on time stamp and selecting messages based on priority by:

while selecting messages based on priority, selecting a first message among a plurality of messages received at a respective first inbox among the plurality of inboxes to process in the first hardware thread based on the first message being associated with a highest priority among the plurality of received messages;

in response to processing the first message, switching from selecting messages based on priority to selecting messages based on time stamp;

after selecting the first message, and while selecting messages based on time stamp, selecting a second message among the plurality of messages to process in the first hardware thread based on the second message being associated with an earliest time stamp among the plurality of received messages;

in response to processing the second message, switching from selecting messages based on time stamp to selecting messages based on priority; and after selecting the second message, and while selecting messages based on priority, selecting a third message among the plurality of received messages to process in the first hardware thread based on the third message being associated with a highest priority among the plurality of received messages.

11. The circuit arrangement of claim 10, the control logic further configured to determine that two or more messages among the plurality of messages are associated with the highest priority among the plurality of received messages and select the first message among the two or more messages to process in the first hardware thread based on the first message being associated with an earliest time stamp among the two or more messages.

12. The circuit arrangement of claim 10, the control logic further configured to determine that two or more messages among the plurality of messages are associated with the earliest time stamp among the plurality of received messages and select the second message among the two or more messages to process in the first hardware thread based on the second message being associated with the highest priority among the two or more messages.

13. A program product comprising a non-transitory computer readable medium and program code resident on the computer readable medium and defining the circuit arrangement of claim 10.

14. An integrated circuit device comprising the circuit arrangement of claim 10.

15. The integrated circuit device of claim 14, wherein the integrated circuit device further comprises:
 an interconnected set of hardware-based processing elements,
 wherein the first hardware thread is disposed on at least one hardware-based processing element of the interconnected set of hardware-based processing elements.

16. The integrated circuit device of claim 15, wherein the interconnected set of hardware-based processing elements comprises a plurality of nodes interconnected to one another in a Network On Chip (NOC) arrangement.

17. The integrated circuit device of claim 16, wherein at least a subset of the plurality of hardware threads are configured in at least a portion of a software pipeline such that the first hardware thread is configured in the at least a portion of the software pipeline.

18. A circuit arrangement, comprising:
 a plurality of hardware threads configured to process a workload and disposed in at least one processor;
 a plurality of priority message buffers in communication with the respective plurality of hardware threads, each of the plurality of priority message buffers configured to receive a plurality of prioritized messages;
 a plurality of inboxes in communication with the respective plurality of hardware threads, each of the plurality of inboxes configured to receive a plurality of messages; and
 control logic disposed in each of the plurality of hardware threads and configured to, during processing of at least a portion of the workload in a first hardware thread among the plurality of hardware threads, alternate between selecting messages based on time stamp and selecting messages based on priority, wherein the control logic is configured to alternate between selecting messages based on time stamp and selecting messages based on priority by:
  while selecting messages based on priority, selecting a first prioritized message among the plurality of prioritized messages received at a respective first priority message buffer among the plurality of priority message buffers to process in the first hardware thread based on the first prioritized message being associated with a highest priority among the plurality of received prioritized messages;
  in response to processing the first prioritized message, switching from selecting messages based on priority to selecting messages based on time stamp;
  after selecting the first prioritized message, while selecting messages based on time stamp, and while at least one prioritized message received at the first priority message buffer awaits processing by the first hardware thread, selecting a first message among the plurality of messages received at a respective first inbox among the plurality of inboxes and the plurality of received prioritized messages to process in the first hardware thread based on the first message being associated with an earliest time stamp among the plurality of received messages and the plurality of received prioritized messages; and
  in response to processing the first message, switching from selecting messages based on time stamp to selecting messages based on priority.

19. The circuit arrangement of claim 18, wherein the first message is a second prioritized message.

20. The circuit arrangement of claim 18, the control logic further configured to determine that two or more prioritized messages among the plurality of prioritized messages are associated with the highest priority among the plurality of received prioritized messages and select the first prioritized message among the two or more prioritized messages to process in the first hardware thread based on the first prioritized message being associated with an earliest time stamp among the two or more prioritized messages.

21. The circuit arrangement of claim 18, the control logic further configured to determine that two or more messages among the plurality of received messages and the plurality of received prioritized messages are associated with the earliest time stamp and select the first message among the two or more messages to process in the first hardware thread based on the first message being associated with the highest priority among the two or more messages.

22. The circuit arrangement of claim 21, wherein the first message is a second prioritized message.

23. A program product comprising a non-transitory computer readable medium and program code resident on the computer readable medium and defining the circuit arrangement of claim 18.

24. An integrated circuit device comprising the circuit arrangement of claim 18.

25. The integrated circuit device of claim 24, wherein the integrated circuit device further comprises:
   an interconnected set of hardware-based processing elements,
   wherein the first hardware thread is disposed on at least one hardware-based processing element of the interconnected set of hardware-based processing elements.

26. The integrated circuit device of claim 25, wherein the interconnected set of hardware-based processing elements comprises a plurality of nodes interconnected to one another in a Network On Chip (NOC) arrangement.

27. The integrated circuit device of claim 26, wherein at least a subset of the plurality of hardware threads are configured in at least a portion of a software pipeline such that the first hardware thread is configured in the at least a portion of the software pipeline.

* * * * *